(12) United States Patent
Liu et al.

(10) Patent No.: US 11,742,760 B2
(45) Date of Patent: Aug. 29, 2023

(54) RESONANT SWITCHING POWER CONVERTER AND DRIVING CIRCUIT THEREOF

(71) Applicant: Richtek Technology Corporation, Zhubei (TW)

(72) Inventors: Kuo-Chi Liu, Hsinchu (TW); Ta-Yung Yang, Taoyuan (TW); Chung-Lung Pai, Hsinchu (TW)

(*) Notice: Subject to any disclaimer, the term of this patent is extended or adjusted under 35 U.S.C. 154(b) by 3 days.

(21) Appl. No.: 17/520,635

(22) Filed: Nov. 6, 2021

(65) Prior Publication Data

US 2022/0166324 A1    May 26, 2022

Related U.S. Application Data

(60) Provisional application No. 63/118,615, filed on Nov. 25, 2020.

(30) Foreign Application Priority Data

Mar. 3, 2021   (TW) .................. 110107557

(51) Int. Cl.
| | | |
|---|---|---|
| *H02M 3/07* | (2006.01) | |
| *H02M 3/158* | (2006.01) | |
| *H02M 3/00* | (2006.01) | |
| *H02M 1/36* | (2007.01) | |
| *H02M 1/00* | (2006.01) | |

(52) U.S. Cl.
CPC ....... *H02M 3/1584* (2013.01); *H02M 1/0006* (2021.05); *H02M 1/36* (2013.01); *H02M 3/01* (2021.05); *H02M 3/07* (2013.01)

(58) Field of Classification Search
CPC ............. H02M 1/08–088; H02M 3/01; H02M 3/07–078
See application file for complete search history.

(56) References Cited

U.S. PATENT DOCUMENTS

2007/0279107 A1* 12/2007 Nuebling ................ H02M 1/08
                                                         327/110
2021/0194357 A1*  6/2021 Zhang ..................... H02M 1/08

* cited by examiner

*Primary Examiner* — Peter M Novak
(74) *Attorney, Agent, or Firm* — Huan-Yi Lin

(57) ABSTRACT

A resonant switching power converter includes: a power stage circuit and a driving circuit. The power stage circuit includes: a resonant capacitor, a resonant inductor and switches. The driving circuit includes: drivers for driving the switches; and a power supply circuit for providing driving powers to the drivers. The power supply circuit includes: a voltage booster circuit generating a booster power supply according to a clock signal, a DC voltage and an output related signal; driving capacitors, wherein a voltage across each driving capacitor corresponds to one driving power; and supply diodes, which are coupled in series from the booster power supply along a forward direction of the supply diodes. A backward end of each supply diode is coupled to a positive end of one corresponding driving power, to charge one corresponding driving capacitor, thus generating the corresponding driving power.

21 Claims, 9 Drawing Sheets

RESONANT SWITCHING POWER CONVERTER AND DRIVING CIRCUIT THEREOF

CROSS REFERENCE

The present invention claims priority to U.S. 63/118,615 filed on Nov. 25, 2020 and claims priority to TW 110107557 filed on Mar. 3, 2021.

BACKGROUND OF THE INVENTION

Field of Invention

The present invention relates to a resonant switching power converter; particularly, it relates to such resonant switching power converter and a driving circuit thereof capable of supporting different switching power converters of different topologies.

Description of Related Art

Please refer to FIG. 1, which shows a schematic diagram of a conventional switching resonator converter. The conventional switching resonator converter 10 comprises: a power stage circuit 101 and driving circuits 102a~102d. The driving circuits 102a~102d drive corresponding power switches in the power stage circuit 101. To be more specific, the power of the driving circuit 102a comes from a charge pump having a high-voltage capacitor Ccp1 which provides power to the driving circuit 102a. The power of the driving circuit 102b comes from a charge pump having a low-voltage capacitor Ccp2 which provides power to the driving circuit 102b. The prior art shown in FIG. 1 has the following drawbacks: First, it is required for the capacitor Ccp1 and the capacitor Ccp2 in the conventional switching resonator converter 10 to be capacitors capable of withstanding high voltage. Second, in the conventional switching resonator converter 10, the voltage of a capacitor C will be applied to the capacitor Ccp1, which will affect the resonant point of the conventional switching resonator converter 10. In addition, the conventional switching resonator converter 10 has a complicated circuit configuration.

In view of the above, to overcome the drawbacks in the prior art, the present invention proposes a resonant switching power converter and a driving circuit thereof capable of supporting different switching power converters of different topologies.

SUMMARY OF THE INVENTION

From one perspective, the present invention provides a resonant switching power converter, which is configured to operably convert an input voltage to an output voltage; the resonant switching power converter comprising: a power stage circuit, including: at least one resonant capacitor; at least one resonant inductor, which is coupled to the at least one resonant capacitor; and a plurality of switches, which are configured to operably switch electrical connection relationships among the at least one resonant capacitor, the at least one resonant inductor, the input voltage and the output voltage; a driving circuit, including: a plurality of drivers, which are configured to operably generate a plurality of driving signals according to a plurality of operation signals, wherein the plurality of driving signals are configured to operably and periodically operate at least a part of the plurality of switches in at least one resonant charging process and at least one resonant discharging process, so as to convert the input voltage to the output voltage by resonant operation; and a power supply circuit, which is configured to operably provide a plurality of driving powers to a part of the plurality of drivers, wherein the power supply circuit includes: a voltage booster circuit, which is configured to operably generate a booster power supply according to a clock signal, a direct current (DC) voltage and an output related signal which is related to the output voltage, wherein a voltage of the booster power supply is related to a sum of the DC voltage plus the output related signal; a plurality of driving capacitors, wherein a voltage across each driving capacitor corresponds to a corresponding one of the driving powers; and a plurality of supply diodes, which are coupled in series from the booster power supply along a forward direction of the plurality of supply diodes, wherein a backward end of each supply diode is coupled to a positive end of the corresponding driving power, so as to charge a corresponding one of the driving capacitors, thus generating the corresponding driving power, and wherein the plurality of supply diodes are configured to operably block a backward current and a backward voltage.

In one embodiment, the voltage booster circuit, a corresponding one of the driving capacitors and a corresponding one of the supply diodes constitute a charge pump, and wherein when the booster power supply is generated by the voltage booster circuit, the corresponding supply diode charges the corresponding driving capacitor according to the booster power supply, so as to generate the corresponding driving power, wherein a negative end of the corresponding driving power is coupled to the output voltage, and wherein the corresponding driving power is related to the DC voltage.

In one embodiment, the voltage booster circuit includes: a booster capacitor, a charging diode, and a buffer, wherein when a high-level voltage is generated by the buffer according to the clock signal and the DC voltage, the booster power supply is generated according to a sum of a voltage across the booster capacitor plus the high-level voltage, and wherein when a low-level voltage is generated by the buffer according to the clock signal and a ground voltage level, the charging diode is configured to operably charge the booster capacitor according to the output related signal, wherein the output related signal corresponds to the output voltage.

In one embodiment, an operation frequency of the charge pump is greater than or equal to a switching frequency of the plurality of switches.

In one embodiment, the voltage booster circuit, a corresponding one of the driving capacitors, a corresponding one of the supply diodes and a corresponding one of the switches constitute a bootstrap circuit, and wherein when the booster power supply is generated by the voltage booster circuit, the corresponding supply diode charges the corresponding driving capacitor according to a second booster power supply, so as to generate the corresponding driving power, wherein a voltage at the negative end of the corresponding driving power is varied as the plurality of switches perform switching and a voltage at a positive end of the corresponding driving power is also varied as the plurality of switches perform switching, wherein in a steady state, the corresponding driving power is related to the DC voltage, wherein the second booster power supply is related to the booster power supply.

In one embodiment, the voltage booster circuit includes: a booster capacitor, a charging diode, and a buffer, wherein when a high-level voltage is generated by the buffer according to the clock signal and the voltage at the negative end of the corresponding driving power, the booster power supply is generated according to a sum of a voltage across the booster capacitor plus the high-level voltage, and wherein when a low-level voltage is generated by the buffer according to the clock signal and a ground voltage level, the charging diode is configured to operably charge the booster capacitor according to the DC voltage.

In one embodiment, the at least one resonant inductor includes: at least one charging resonant inductor and at least one discharging resonant inductor, wherein the at least one discharging resonant inductor is coupled between the output voltage and the negative end of the corresponding driving power, and wherein a negative end of the corresponding driving capacitor, an end of the corresponding switch and a high voltage end of the at least one discharging resonant inductor are all coupled to the negative end of the corresponding driving power;

wherein in the at least one resonant charging process, the at least one charging resonant inductor is connected in series to the at least one resonant capacitor, so as to execute a resonant charging operation, and wherein in the at least one resonant discharging process, the at least one discharging resonant inductor is connected in series to the at least one resonant capacitor, so as to execute a resonant discharging operation.

In one embodiment, the power stage circuit is a resonant switching capacitor converter; wherein in the at least one resonant charging process, the power stage circuit is configured to operably control the plurality of switches, so that a series connection of the at least one resonant capacitor and the at least one resonant inductor is formed between the input voltage and the output voltage, to form a charging path, whereby a resonant charging operation is performed on the at least one resonant capacitor and the at least one resonant inductor; wherein in the at least one resonant discharging process, the power stage circuit is configured to operably control the plurality of switches, so that a series connection of each resonant capacitor and a corresponding one of the resonant inductors is formed between the output voltage and a ground voltage level, to simultaneously or sequentially form a plurality of discharging paths, whereby a resonant discharging operation is performed on the at least one resonant capacitor and the at least one resonant inductor, thus generating the output voltage.

In one embodiment, the power stage circuit is a switching resonator converter, and wherein the power stage circuit further includes: at least one resonator and at least one nonresonant capacitor, wherein the at least one resonator is formed by the at least one resonant capacitor and the at least one resonant inductor which are connected in series to each other; wherein the plurality of switches are coupled to the at least one resonator and the at least one nonresonant capacitor and are configured to operably switch electrical connection relationships of the at least one resonator and the at least one nonresonant capacitor; wherein in the at least one resonant charging process, a resonant charging operation is performed on the at least one resonator; wherein in the at least one resonant discharging process, a resonant discharging operation is performed on the at least one resonator to charge the at least one nonresonant capacitor, thus generating the output voltage.

In one embodiment, the power supply circuit further includes: a plurality of driving power switches, wherein each driving power switch is connected in parallel to a corresponding one of the supply diodes, wherein in a case where the power stage circuit is a resonant switching capacitor converter, the plurality of driving power switches are arranged to be always ON, and wherein in a case where the power stage circuit is a switching resonator converter, the plurality of driving power switches are arranged to be always OFF.

In one embodiment, each of the driving power switches is a metal-oxide-semiconductor (MOS) transistor whose body diode corresponds to one of the supply diodes.

In one embodiment, the resonant switching power converter is a bidirectional resonant switching power converter.

In one embodiment, in a case where a conversion ratio of the input voltage of the resonant switching power converter to the output voltage of the resonant switching power converter is N:1, a number of the at least one resonant capacitor is equal to N−1, wherein N denotes a positive integer.

In one embodiment, the resonant switching power converter operates according to following sequence: (1) providing the DC voltage and the clock signal to the voltage booster circuit; (2) next, providing a plurality of operation signals to the plurality of drivers; and (3) further next, providing the input voltage to the power stage circuit.

From another perspective, the present invention provides a driving circuit, which is configured to operably drive a resonant switching power converter, wherein the resonant switching power converter is configured to operably convert an input voltage to an output voltage and the resonant switching power converter comprises a power stage circuit, wherein the power stage circuit includes a plurality of switches; the driving circuit comprising: a plurality of drivers, which are configured to operably generate a plurality of driving signals according to a plurality of operation signals, wherein the plurality of driving signals are configured to operably and periodically operate at least a part of the plurality of switches in at least one resonant charging process and at least one resonant discharging process, so as to convert the input voltage to the output voltage by resonant operation; and a power supply circuit, which is configured to operably provide a plurality of driving powers to a part of the plurality of drivers, wherein the power supply circuit includes: a voltage booster circuit, which is configured to operably generate a booster power supply according to a clock signal, a direct current (DC) voltage and an output related signal which is related to the output voltage, wherein a voltage of the booster power supply is related to a sum of the DC voltage plus the output related signal; a plurality of driving capacitors, wherein a voltage across each driving capacitor corresponds to a corresponding one of the driving powers; and a plurality of supply diodes, which are coupled in series from the booster power supply along a forward direction of the plurality of supply diodes, wherein a backward end of each supply diode is coupled to a positive end of the corresponding driving power, so as to charge a corresponding one of the driving capacitors, thus generating the corresponding driving power, and wherein the plurality of supply diodes are configured to operably block a backward current and a backward voltage.

In one embodiment, the voltage booster circuit, a corresponding one of the driving capacitors and a corresponding one of the supply diodes constitute a charge pump, and wherein when the booster power supply is generated by the voltage booster circuit, the corresponding supply diode charges the corresponding driving capacitor according to the booster power supply, so as to generate the corresponding driving power, wherein a negative end of the corresponding driving power is coupled to the output voltage, and wherein the corresponding driving power is related to the DC voltage.

In one embodiment, the voltage booster circuit includes: a booster capacitor, a charging diode, and a buffer, wherein when a high-level voltage is generated by the buffer according to the clock signal and the DC voltage, the booster power supply is generated according to a sum of a voltage across the booster capacitor plus the high-level voltage, and wherein when a low-level voltage is generated by the buffer according to the clock signal and a ground voltage level, the charging diode is configured to operably charge the booster capacitor according to the output related signal, wherein the output related signal corresponds to the output voltage.

In one embodiment, an operation frequency of the charge pump is greater than or equal to a switching frequency of the plurality of switches.

In one embodiment, the voltage booster circuit, a corresponding one of the driving capacitors, a corresponding one of the supply diodes and a corresponding one of the switches constitute a bootstrap circuit, and wherein when the booster power supply is generated by the voltage booster circuit, the corresponding supply diode charges the corresponding driving capacitor according to a second booster power supply, so as to generate the corresponding driving power, wherein a voltage at the negative end of the corresponding driving power is varied as the plurality of switches perform switching and a voltage at a positive end of the corresponding driving power is also varied as the plurality of switches perform switching, wherein in a steady state, the corresponding driving power is related to the DC voltage, wherein the second booster power supply is related to the booster power supply.

In one embodiment, the voltage booster circuit includes: a booster capacitor, a charging diode, and a buffer, wherein when a high-level voltage is generated by the buffer according to the clock signal and the voltage at the negative end of the corresponding driving power, the booster power supply is generated according to a sum of a voltage across the booster capacitor plus the high-level voltage, and wherein when a low-level voltage is generated by the buffer according to the clock signal and a ground voltage level, the charging diode is configured to operably charge the booster capacitor according to the DC voltage.

In one embodiment, the power supply circuit further includes: a plurality of driving power switches, wherein each driving power switch is connected in parallel to a corresponding one of the supply diodes, wherein in a case where the power stage circuit is a resonant switching capacitor converter, the plurality of driving power switches are arranged to be always ON, and wherein in a case where the power stage circuit is a switching resonator converter, the plurality of driving power switches are arranged to be always OFF.

In one embodiment, each of the driving power switches is a metal-oxide-semiconductor (MOS) transistor whose body diode corresponds to one of the supply diodes.

Advantages of the present invention include: that the driving circuit of the present invention can support different switching power converters having different topologies; and that the present invention can provide sufficient power to a power stage circuit via one single power supply circuit.

Another advantage of the present invention includes: that the driving circuit of the present invention can achieve optimal power efficiency by adjusting the supply voltage.

Another advantage of the present invention includes: that as compared to prior art driving circuit, the driving circuit of the present invention requires less numbers of devices and pins.

The objectives, technical details, features, and effects of the present invention will be better understood with regard to the detailed description of the embodiments below, with reference to the attached drawings.

DESCRIPTION OF THE PREFERRED EMBODIMENTS

The drawings as referred to throughout the description of the present invention are for illustration only, to show the interrelations between the circuits and the signal waveforms, but not drawn according to actual scale of circuit sizes and signal amplitudes and frequencies.

Figure 1:
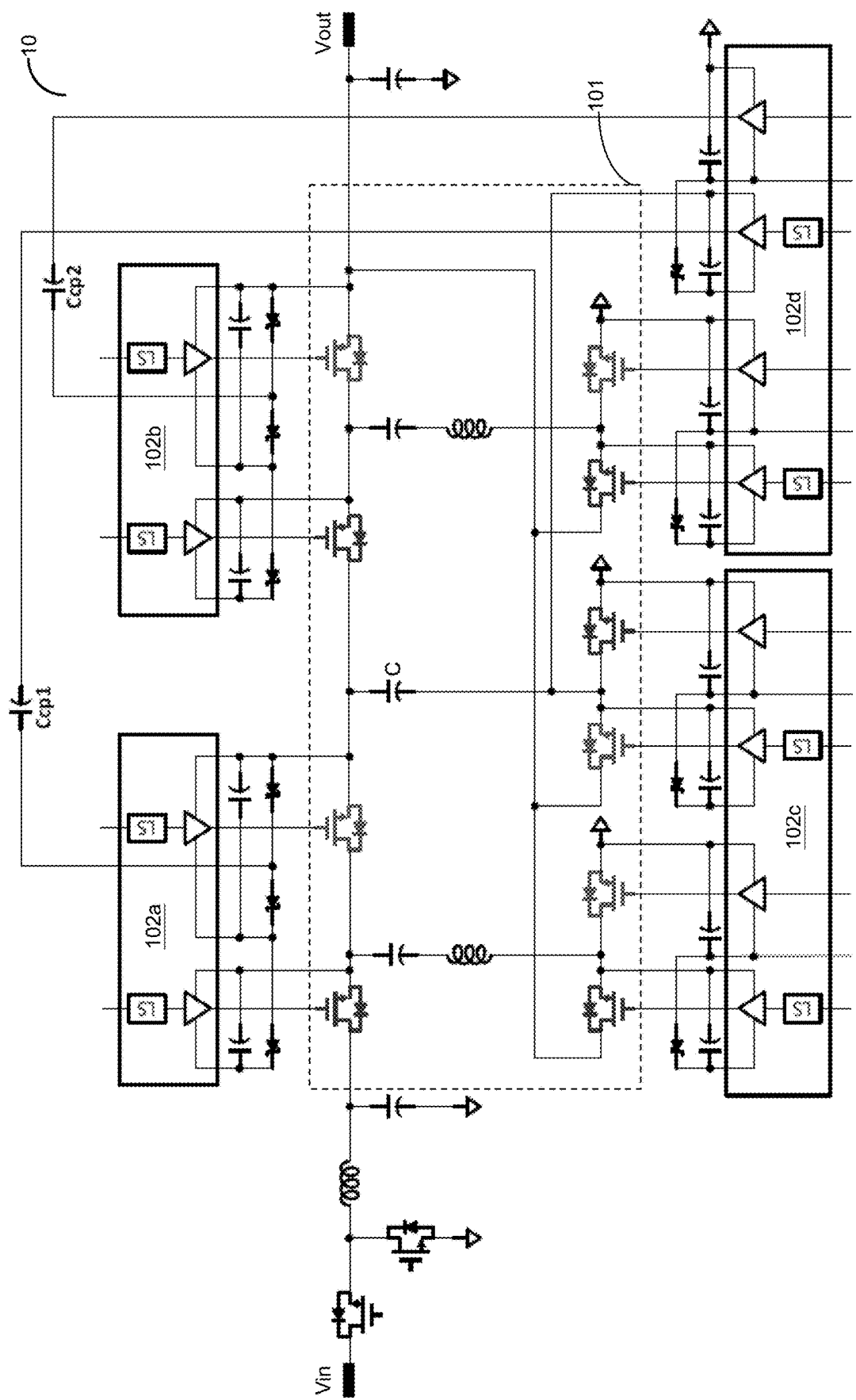
FIG. 1 shows a schematic diagram of a conventional switching resonator converter.
Figure 2:
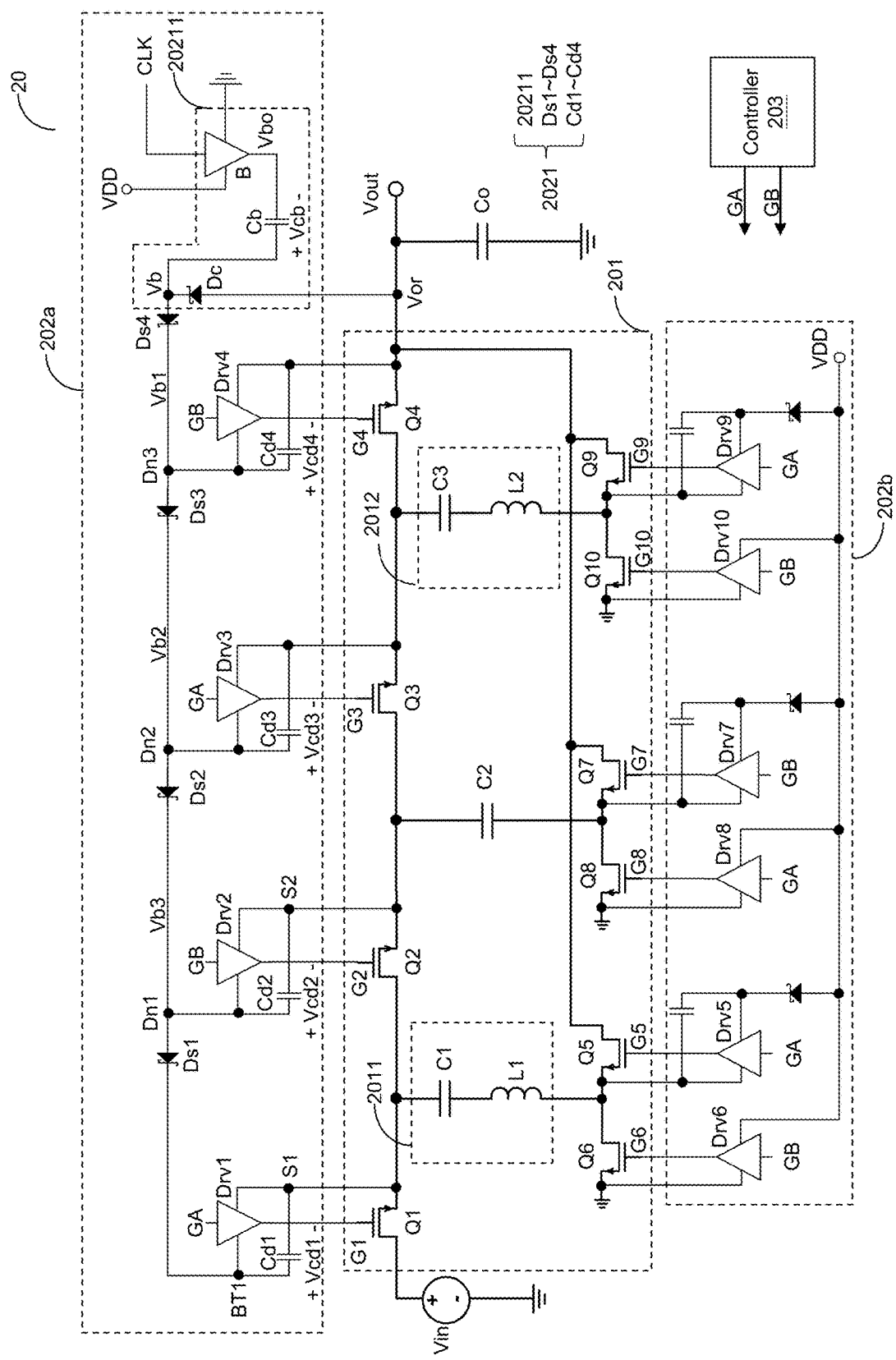
FIG. 2 shows a schematic circuit diagram of a resonant switching power converter according to an embodiment of the present invention.

Please refer to FIG. 2, which shows a schematic circuit diagram of a resonant switching power converter according to an embodiment of the present invention. As shown in FIG. 2, in one embodiment, the resonant switching power converter 20 comprises: a power stage circuit 201, a driving circuit 202a, a driving circuit 202b and a controller 203. The power stage circuit 201 comprises: resonant capacitors C1 and C3, at least one non-resonant capacitor C2, switches Q1-Q10, and resonant inductors L1 and L2. The resonant switching power converter 20 comprises at least one resonator (e.g., resonators 2011 and 2012). The resonator 2011 includes: a resonant capacitor C1 and a resonant inductor L1 which are connected in series to each other, whereas, the resonator 2012 includes: a resonant capacitor C2 and a resonant inductor L2 which are connected in series to each other.

The power switches Q1-Q10 are coupled to the resonator 2011 and the resonator 2012, wherein the power switches Q1-Q10 are configured to operably switch electrical connection relationships of the resonator 2011 and the resonator 2012 according to driving signals G1~G10 in correspondence to a resonant charging process and a resonant discharging process, ly. In the resonant charging process, a resonant charging operation is performed on the resonator 2011 and the resonator 2012. In the resonant discharging process, a resonant discharging operation is performed on the resonator 2011 and the resonator 2012.

At least one non-resonant capacitor C2 is coupled to the at least one resonator (e.g., resonators 2011 and 2012), and the electrical connection relationship of the non-resonant capacitor C2 with the at least one resonator (e.g., resonator 2011 and resonator 2012) is controlled according to the driving signals G1-G10. The voltage across the at least one non-resonant capacitor C2 has a constant ratio to the input voltage Vin. For example, in this embodiment, the voltage across the at least one non-resonant capacitor C2 is ½ of the input voltage Vin. The controller 203 is configured to operably generate a charging operation signal GA corresponding to the resonant charging process and a discharging operation signal GB corresponding to the resonant discharging process.

The driving circuit 202a includes: drivers Drv1~Drv4 and a power supply circuit 2021. The driving circuit 202b includes drivers Drv5~Drv10. The drivers Drv1~Drv10 are configured to operably generate charging driving signals G1, G3, G5, G8 and G9 according to the charging operation signal GA and generate discharging driving signals G2, G4, G6, G7 and G10 according to the discharging operation signal GB. The charging driving signals G1, G3, G5, G8 and G9 and the discharging driving signals G2, G4, G6, G7 and G10 are configured to operably and periodically operate the switches Q1~Q10 in at least one resonant charging process and at least one resonant discharging process, so as to convert an input voltage Vin to an output voltage Vout by resonant operation. In one embodiment, the charging driving signals G1, G3, G5, G8 and G9 are in-phase with the charging operation signal GA, whereas, the discharging driving signals G2, G4, G6, G7 and G10 are in-phase with the discharging operation signal GB. In one embodiment, the charging operation signal GA is in reversed-phase to the discharging operation signal GB. The power supply circuit 2021 is configured to operably provide driving powers Vcd1~Vcd4 to the drivers Drv1~Drv4. The power supply circuit 2021 includes: a voltage booster circuit 20211, driving capacitors Cd1~Cd4 and supply diodes Ds1~Ds4. The voltage booster circuit 20211 is configured to operably generate a booster power supply Vb according to a clock signal CLK, a direct current (DC) voltage VDD and an output related signal Vor which is related to the output voltage Vout. In one embodiment, the voltage of the booster power supply Vb is related to a sum of the DC voltage VDD plus the output related signal Vor. The voltage across each of the driving capacitor Cd1~Cd4 corresponds to each of the driving power Vcd1~Vcd4.

In one embodiment, the voltage booster circuit 20211 includes: a booster capacitor Cb, a charging diode Dc, and a buffer B. The clock signal CLK is coupled to an input end of the buffer B. The DC voltage DCC is coupled to a positive power supply end of the buffer B, whereas, a ground voltage level is coupled to a negative power supply end of the buffer B. An output end of the buffer B is coupled to a negative end of the booster the capacitor Cb. A positive end of the booster capacitor Cb and a backward end of the charging diode Dc are commonly coupled to the booster power supply Vb. The output related signal Vor is coupled to an forward end of the charging diode Dc. When the buffer B generates a low-level voltage at its buffer output Vbo according to the clock signal CLK and the ground voltage level, the charging diode Dc charges the booster capacitor Cb according to the output related signal Vor. On the other hand, when the buffer B generates a high-level voltage at its buffer output Vbo according to the clock signal CLK and the DC voltage VDD, the booster power supply Vb is generated according to a sum of a voltage Vcb across the booster capacitor Cb plus the high-level voltage. In one embodiment, the output related signal Vor corresponds to the output voltage Vout. In one embodiment, the voltage booster circuit 20211, the corresponding driving capacitor Cd4 and the corresponding supply diode Ds4 constitute a charge pump. When the booster power supply Vb is generated by the voltage booster circuit 20211, the corresponding supply diode Ds4 charges the corresponding driving capacitor Cd4 according to the booster power supply Vb, so as to generate the corresponding driving power Vcd4. In one embodiment, a negative end of the driving power Vcd4 is coupled to the output voltage Vout, and the driving power Vcd4 is related to the DC voltage VDD. In one embodiment, the operation frequency of the charge pump is greater than or equal to the switching frequencies of the switches Q1-Q10.

In one embodiment, the voltage booster circuit 20211, corresponding driving capacitor Cd1~Cd3, corresponding supply diode Ds1~Ds3 and corresponding switch Q2~Q4 constitute a bootstrap circuit. For example, when the booster power supply Vb is generated by the voltage booster circuit 20211, the supply diode Ds3 charges the corresponding driving capacitor Cd3 according to a second booster power supply (e.g., Vb1), so as to generate the driving power Vcd3. The voltage at the negative end of the driving power Vcd3 is varied as the switch Q3 performs switching and the voltage at the positive end of each driving power Vcd3 is also varied as the switch Q3 performs switching. In a steady state, the driving power Vcd3 is related to the DC voltage VDD. When the booster power supply Vb is generated by the voltage booster circuit 20211, the supply diode Ds2 charges the corresponding driving capacitor Cd2 according to a second booster power supply (e.g., Vb2), so as to generate the driving power Vcd2. The voltage at the negative end of the driving power Vcd2 is varied as the switch Q2 performs switching and the voltage at the positive end of the driving power Vcd2 is also varied as the switch Q2 performs switching. In a steady state, the driving power Vcd2 is related to the DC voltage VDD. When the booster power supply Vb is generated by the voltage booster circuit 20211, the supply diode Ds1 charges the corresponding driving capacitor Cd1 according to a second booster power supply (e.g., Vb3), so as to generate the driving power Vcd1. The voltage at the negative end of the driving power Vcd1 is varied as the switch Q1 performs switching and the voltage (i.e., BT1) at the positive end of the driving power Vcd1 is also varied as the switch Q1 performs switching. In a steady state, the driving power Vcd1 is related to the DC voltage VDD. In one embodiment, the second booster power supplies Vb1, Vb2 and Vb3 are related to the booster power supply Vb. In addition to providing the above-mentioned second booster power supplies Vb1, Vb2 and Vb3 along a forward direction of the supply diodes Ds1~Ds3, the supply diodes Ds1~Ds3 are configured to operably block the backward current and backward voltage. In one embodiment, the supply diodes Ds1~Ds3 can be a PN junction diode, a Schottky diode or any other type of diode.

From one perspective, the supply diodes Ds1~Ds4 are coupled in series from the booster power supply Vb in a sequential order along a forward direction of the supply diodes Ds1~Ds4. Each driving capacitor Cd2~Cd4 is coupled between a node between the supply diodes Ds1~Ds4 and a source of the corresponding power switch Q2~Q4. More specifically, the driving capacitor Cd4 is coupled between a node Dn3 between the supply diodes Ds3~Ds4 and a source of the power switch Q4; the driving capacitor Cd3 is coupled between a node Dn2 between the supply diodes Ds2~Ds3 and a source of the power switch Q3; the driving capacitor Cd2 is coupled between a node Dn1 between the supply diodes Ds1-Ds2 and a source of the power switch Q2. The driving capacitor Cd1 is coupled between a backward end of the supply diode Ds1 and a source of the power switch Q1. In one embodiment, the voltage across each driving capacitor Cd1~Cd4 corresponds to the corresponding driving power Vcd1~Vcd4, wherein the driving powers Vcd1~Vcd4 are provided to corresponding drivers Drv1~Drv4, respectively. In one embodiment, the driving capacitor Cd1-Cd4 and the corresponding driver Drv1~Drv4 is connected in parallel between the positive end and negative end of the corresponding driving capacitor Cd1~Cd4. The output end of each driver Drv1~Drv4 is coupled to the gate of the corresponding power switch Q1~Q4, to output the charging driving signals G1 and G3 and the discharging driving signals G2 and G4 to the corresponding power switch Q1~Q4. In one embodiment, the backward end of each supply diode Ds1-Ds4 is coupled to the positive end of the corresponding driving power Vcd1~Vcd4, so as to charge the corresponding driving capacitor Cd1~Cd4, thus generating the corresponding driving power Vcd1~Vcd4. Besides, the supply diodes Ds1-Ds4 are configured to operably block a backward current and a backward voltage. To be more specific, the voltages of the second booster power supplies Vb1, Vb2 and Vb3 are respectively equal to the booster power supply Vb deducted by a corresponding amount of diode forward conductive voltages. The negative end of each driving power Vcd1~Vcd4 is coupled to the source of the corresponding power switch Q1~Q4.

It is noteworthy that, in one embodiment, the above-mentioned resonant charging process and the above-mentioned resonant discharging process are arranged in a repeated, alternating manner, so as to convert the input voltage Vin to an output voltage Vout. In one embodiment, the charging operation signal GA and the discharging operation signal GB have ON periods which do not overlap one another, so that the resonant charging process and the resonant discharging process do not overlap each other.

In one embodiment, the resonant switching power converter operates according to following sequence, to achieve power conversion: (1) providing the DC voltage and the clock signal to the voltage booster circuit; (2) next, providing plural operation signals to plural drivers; and (3) further next, providing the input voltage to the power stage circuit.

The operation mechanism as to how the resonator 2011 and the resonator 2012 in FIG. 2 operate is well known to those skilled in the art, so the details thereof are not redundantly explained here.

Figure 3:
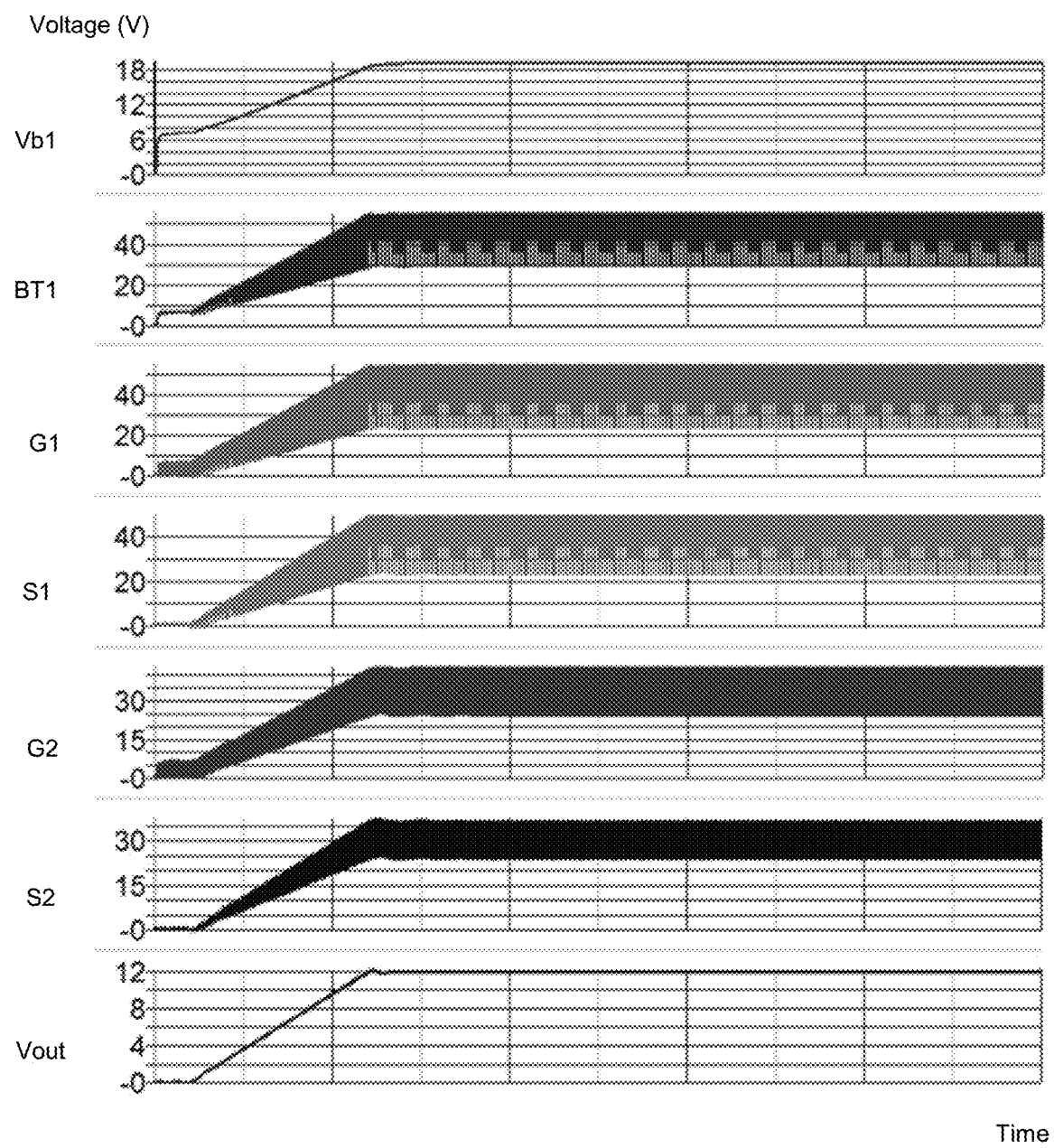
FIG. 3 and FIG. 4 illustrate signal waveform diagrams depicting the operation of the resonant switching power converter of FIG. 2.
Figure 4:
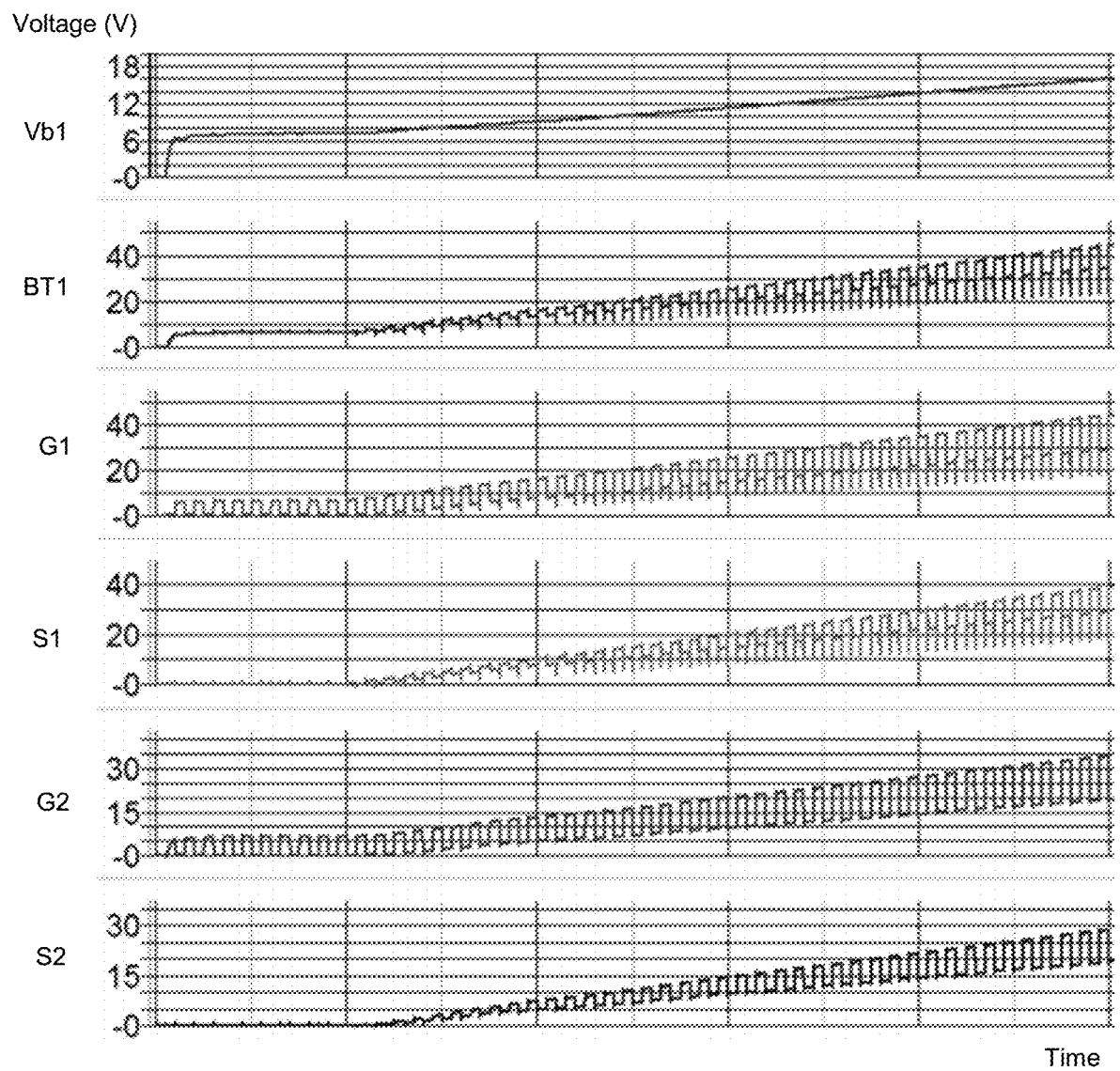

Please refer to FIG. 3 and FIG. 4, which illustrate signal waveform diagrams depicting the operation of a resonant switching power converter of FIG. 2. FIG. 4 is an expanded version of the time frame shown in FIG. 3. The second booster power supply Vb1, the voltage of the node BT1, the charging driving signal G1, the voltage of the node S1, the discharging driving signal G2, the voltage of the node S2 and the output voltage Vout are shown in FIG. 3 and FIG. 4.

Figure 5:
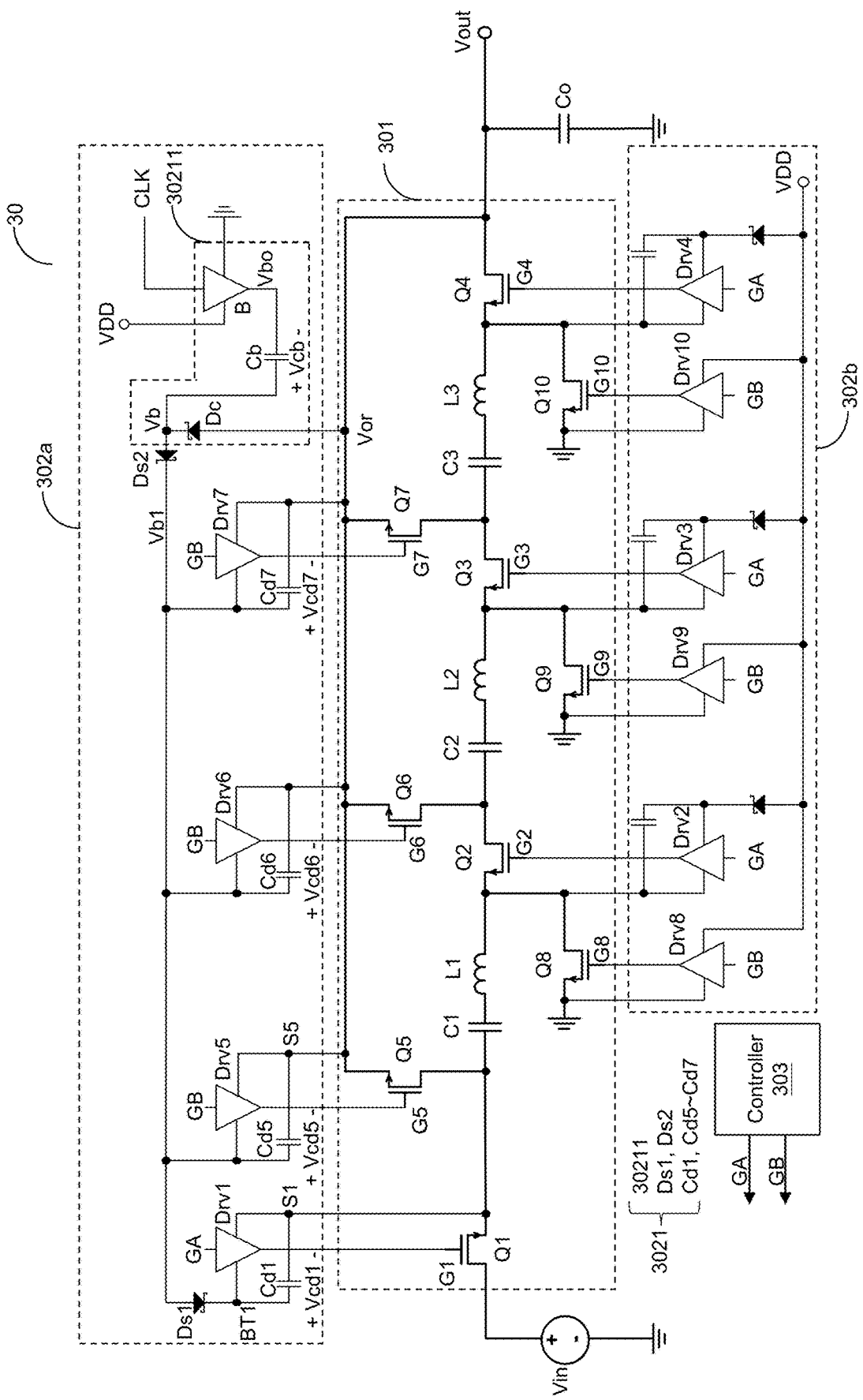
FIG. 5 shows a schematic circuit diagram of a resonant switching power converter according to another embodiment of the present invention.

Please refer to FIG. 5, which shows a schematic circuit diagram of a resonant switching power converter according to another embodiment of the present invention. As shown in FIG. 5, in one embodiment, the resonant switching power converter 30 comprises: a power stage circuit 301, a driving circuit 302a, a driving circuit 302b and a controller 303. The power stage circuit 201 comprises: resonant capacitors C1, C2 and C3, switches Q1-Q10, and resonant inductors L1, L2 and L3. The switches Q1, Q2 and Q3 are connected in series to the corresponding capacitors C1, C2 and C3, respectively.

The capacitors C1, C2 and C3 are connected in series to the resonant inductors L1, L2 and L3, respectively. However, it should be understood that the implementation of the numbers of the resonant capacitors and resonant inductors of the resonant switching power converter 30 as three in the above-mentioned preferred embodiment is only an illustrative example, but not for limiting the broadest scope of the present invention. In other embodiments, it is also practicable and within the scope of the present invention that the numbers of the resonant capacitors and resonant inductors of the resonant switching power converter 30 can be any plural number other than three. It should be understood that the number of a device in the above-mentioned preferred embodiment is only given as an illustrative example. Further, in one embodiment, the above-mentioned resonant switching power converter 30 can be a bidirectional resonant switching power converter. As one having ordinary skill in the art readily understands, in a "bidirectional resonant switching power converter", the input terminal (which is coupled to the input voltage Vin) and the output terminal (which is coupled the output voltage Vout) are interchangeable. That is, in the embodiment shown in FIG. 5, the resonant switching power converter 30 can convert the output voltage Vout to the input voltage Vin.

As shown in FIG. 5, in one embodiment, one end of the power switch Q5 is coupled to a node between the power switch Q1 and the capacitor C1. One end of the power switch Q6 is coupled to a node between the power switch Q2 and the capacitor C2. One end of the power switch Q7 is coupled to a node between the power switch Q3 and the capacitor C3. One end of the power switch Q8 is coupled to a node between the power switch Q2 and the resonant inductor L1. One end of the power switch Q9 is coupled to a node between the power switch Q3 and the resonant inductor L2. One end of the power switch Q10 is coupled to a node between the power switch Q4 and the resonant inductor L3. As shown in FIG. 5, the other ends of the power switches Q5-Q7 are commonly electrically connected to the output voltage Vout. The other ends of the power switches Q8-Q10 are commonly coupled to the ground voltage level. The power switch Q4 is coupled between the resonant inductor L3 and the output voltage Vout. The other end of the power switch Q1 is coupled to the input voltage Vin. The controller 303 is configured to operably generate a charging operation signal GA corresponding to a resonant charging process and a discharging operation signal GB corresponding to a resonant discharging process.

The driving circuit 302a includes: drivers Drv1 and Drv5~Drv7 and a power supply circuit 3021. The driving circuit 302b includes drivers Drv2~Drv4 and Drv8~Drv10. The drivers Drv1~Drv10 are configured to operably generate charging driving signals G1~G4 according to the charging operation signal GA and generate discharging driving signals G5~G10 according to the discharging operation signal GB. The charging driving signals G1~G4 and the discharging driving signals G5~G10 are configured to operably and periodically operate the switches Q1~Q10 in at least one resonant charging process and at least one resonant discharging process, so as to convert an input voltage Vin to an output voltage Vout by resonant operation. In one embodiment, the charging driving signals G1~G4 are in-phase with the charging operation signal GA, whereas, the discharging driving signals G5~G10 are in-phase with the discharging operation signal GB. The power supply circuit 3021 is configured to operably provide driving powers Vcd1 and Vcd5~Vcd7 to the drivers Drv1 and Drv5~Drv7. The power supply circuit 3021 includes: a voltage booster circuit 30211, driving capacitors Cd1 and Cd5~Cd7 and supply diodes Ds1 and Ds2. The voltage booster circuit 30211 is configured to operably generate a booster power supply Vb according to a clock signal CLK, a direct current (DC) voltage VDD and an output related signal Vor which is related to the output voltage Vout. In one embodiment, the voltage of the booster power supply Vb is related to a sum of the DC voltage VDD plus the output related signal Vor.

In one embodiment, the voltage booster circuit 30211 includes: a booster capacitor Cb, a charging diode Dc, and a buffer B. The clock signal CLK is coupled to an input end of the buffer B. The DC voltage DCC is coupled to a positive power supply end of the buffer B, whereas, a ground voltage level is coupled to a negative power supply end of the buffer B. An output end of the buffer B is coupled to a negative end of the booster capacitor Cb. A positive end of the booster capacitor Cb and a backward end of the charging diode Dc are commonly coupled to the booster power supply Vb. The output related signal Vor is coupled to a forward end of the charging diode Dc. When the buffer B generates a low-level voltage at its buffer output Vbo according to the clock signal CLK and a ground voltage level, the charging diode Dc charges the booster capacitor Cb according to the output related signal Vor. On the other hand, when the buffer B generates a high-level voltage at its buffer output Vbo according to the clock signal CLK and the DC voltage VDD, the booster power supply Vb is generated according to a sum of a voltage Vcb across the booster capacitor Cb plus the high-level voltage. In one embodiment, the output related signal Vor corresponds to (or, is) the output voltage Vout. In one embodiment, the voltage booster circuit 30211, a corresponding one of the driving capacitors Cd5~Cd7 and the corresponding supply diode Ds2 constitute a charge pump. For example, when the booster power supply Vb is generated by the voltage booster circuit 30211, the corresponding supply diode Ds2 charges the corresponding driving capacitor Cd7 according to the booster power supply Vb, so as to generate the corresponding driving power Vcd7; the corresponding supply diode Ds2 charges the corresponding driving capacitor Cd6 according to the booster power supply Vb, so as to generate the corresponding driving power Vcd6; and the corresponding supply diode Ds2 charges the corresponding driving capacitor Cd5 according to the booster power supply Vb, so as to generate the corresponding driving power Vcd5. In one embodiment, the negative end of each driving power Vcd5~Vcd7 is coupled to the output voltage Vout. Each driving power Vcd5~Vcd7 is related to the DC voltage VDD. In one embodiment, an operation frequency of the charge pump is greater than or equal to a switching frequency of the switches Q1~Q10.

In one embodiment, the voltage booster circuit 30211, the corresponding driving capacitor Cd1, the corresponding supply diode Ds1 and the corresponding switch Q1 constitute a bootstrap circuit. For example, when the booster power supply Vb is generated by the voltage booster circuit 30211, the corresponding supply diode Ds1 charges the corresponding driving capacitor Cd1 according to a second booster power supply Vb1, so as to generate the corresponding driving power Vcd1. In one embodiment, a voltage at the negative end of the driving power Vcd1 is varied as the switch Q1 performs switching and a voltage (i.e., BT1) at the positive end of the driving power Vcd1 is also varied as the switch Q1 performs switching. In a steady state, the driving power Vcd1 is related to the DC voltage VDD. In one embodiment, the second booster power supply Vb1 is related to the booster power supply Vb.

The supply diodes Ds1-Ds2 are coupled in series from the booster power supply Vb in a sequential order along a forward direction of the supply diodes Ds1~Ds2. Each driving capacitor Cd5~Cd7 has its positive end commonly coupled to a node between the supply diodes Ds1~Ds2, whereas, each driving capacitor Cd5~Cd7 has its negative end commonly coupled to output related signal Vor. The driving capacitor Cd1 is coupled between a backward end of the supply diode Ds1 and a source of the power switch Q1. In one embodiment, the voltage across the driving capacitors Cd1 and Cd5~Cd7 corresponds to the corresponding driving power Vcd1 and Vcd5~Vcd7, wherein each driving power Vcd1 and Vcd5~Vcd7 provides power supply to a corresponding one of the drivers Drv1 and Drv5~Drv7. In one embodiment, the drivers Drv1 and Drv5~Drv7 are respectively coupled between the controller 303 and the corresponding power switches Q1 and Q5~Q7, wherein each driver Drv1 and Drv5~Drv7 is configured to operably control a corresponding one of the power switches Q1 and Q5~Q7 according to the charging operation signal GA and the discharging operation signal GB. In one embodiment, each driving capacitor Cd1 and Cd5~Cd7 is connected in parallel with a corresponding one of the drivers Drv1 and Drv5~Drv7 between a positive end and a negative end of the corresponding driving capacitor Cd1 and Cd5~Cd7. The output end of each driver Drv1 and Drv5~Drv7 is coupled to the gate of the corresponding power switch Q1 and Q5~Q7, so as to output the charging driving signal G1 and discharging driving signals G5~G7 to the corresponding power switch Q1 and Q5~Q7. In one embodiment, the backward end of each supply diode Ds1-Ds2 is coupled to a positive end of the corresponding driving power Vcd1~Vcd2, so as to charge the driving capacitors Cd1 and Cd5~Cd7 to generate the corresponding driving power Vcd1~Vcd2. Besides, the supply diodes Ds1~Ds2 are configured to operably block a backward current and a backward voltage. In this embodiment, the negative end of the driving power Vcd1 is coupled to the source S1 of the power switch Q1. The negative end of each driving power Vcd5~Vcd7 is coupled to the output related signal Vor. In this embodiment, the output related signal Vor corresponds to (or, is) the output voltage Vout.

To be more specific, the switches Q1-Q10 can switch electrical connection relationships between the resonant capacitors C1-C3 and the resonant inductors L1-L3 according to the charging driving signals G1~G4 and the discharging driving signals G5~G10. In a resonant charging process, according to the charging driving signals G1~G4 and the discharging driving signals G5~G10, the switches Q1~Q4 are ON, whereas, the switches Q5~Q10 are OFF, so that a series connection of the resonant capacitors C1-C3 and the resonant inductors L1-L3 is formed between the input voltage Vin and the output voltage Vout, to form a charging path. In a resonant discharging process, according to the charging driving signals G1~G4 and the discharging driving signals G5~G10, the switches Q5-Q10 are ON, whereas, the switches Q1-Q4 are OFF, so that a series connection of the resonant capacitor C1 and the corresponding resonant inductor L1 is formed between the output voltage Vout and the ground voltage level and so that a series connection of the resonant capacitor C2 and the corresponding resonant inductor L2 is formed between the output voltage Vout and the ground voltage level and so that a series connection of the resonant capacitor C3 and the corresponding resonant inductor L3 is formed between the output voltage Vout and the ground voltage level, which form plural discharging paths.

Figure 6:
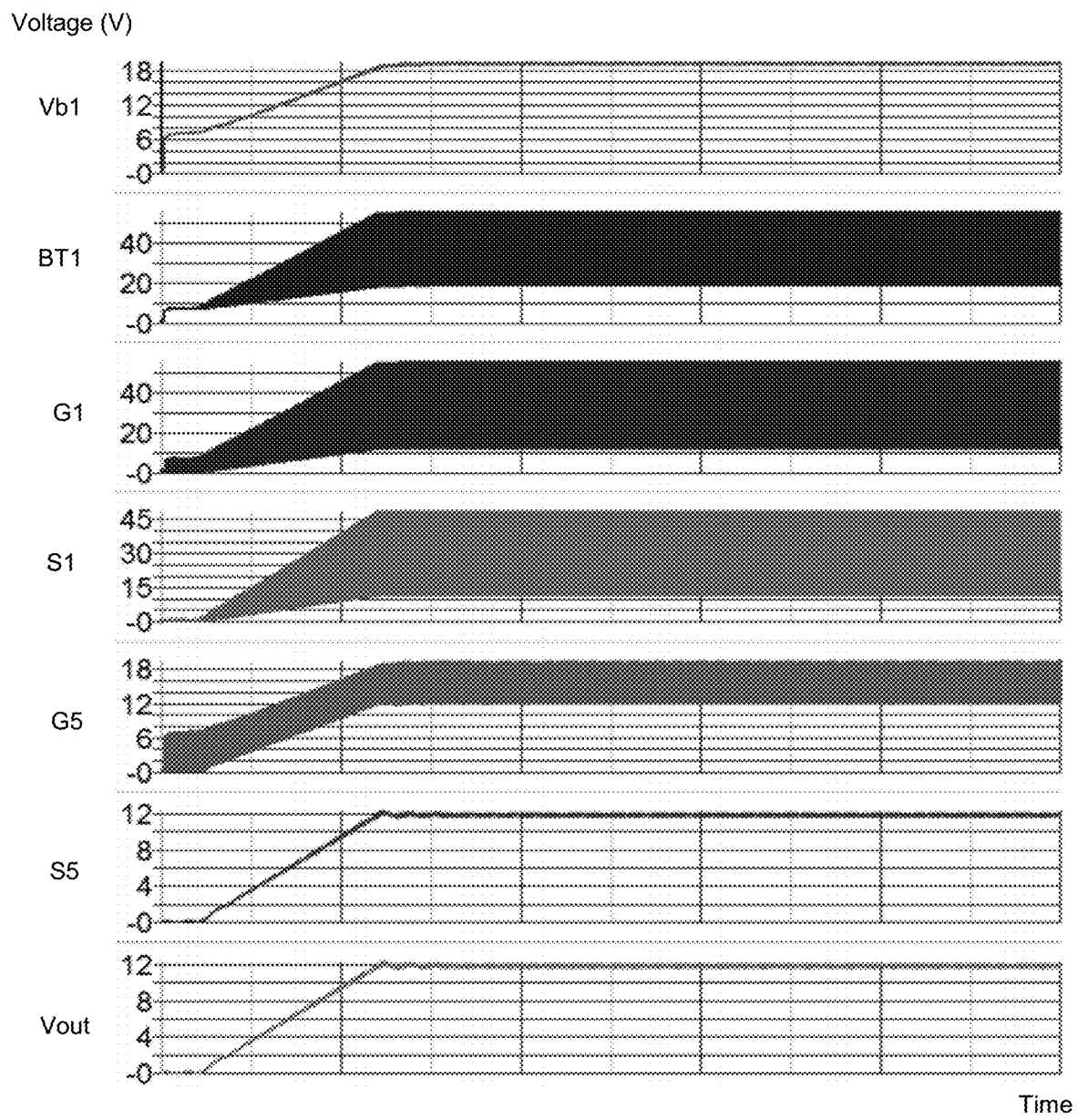
FIG. 6 illustrates a signal waveform diagram depicting the operation of the resonant switching power converter of FIG. 5.

Please refer to FIG. 6, which illustrates a signal waveform diagram depicting the operation of a resonant switching power converter of FIG. 5. The second booster power supply Vb1, the voltage of the node BT1, the charging driving signal G1, the voltage of the node S1, the discharging driving signal G5, the voltage of the node S5 and the output voltage Vout are shown in FIG. 6.

Figure 7:
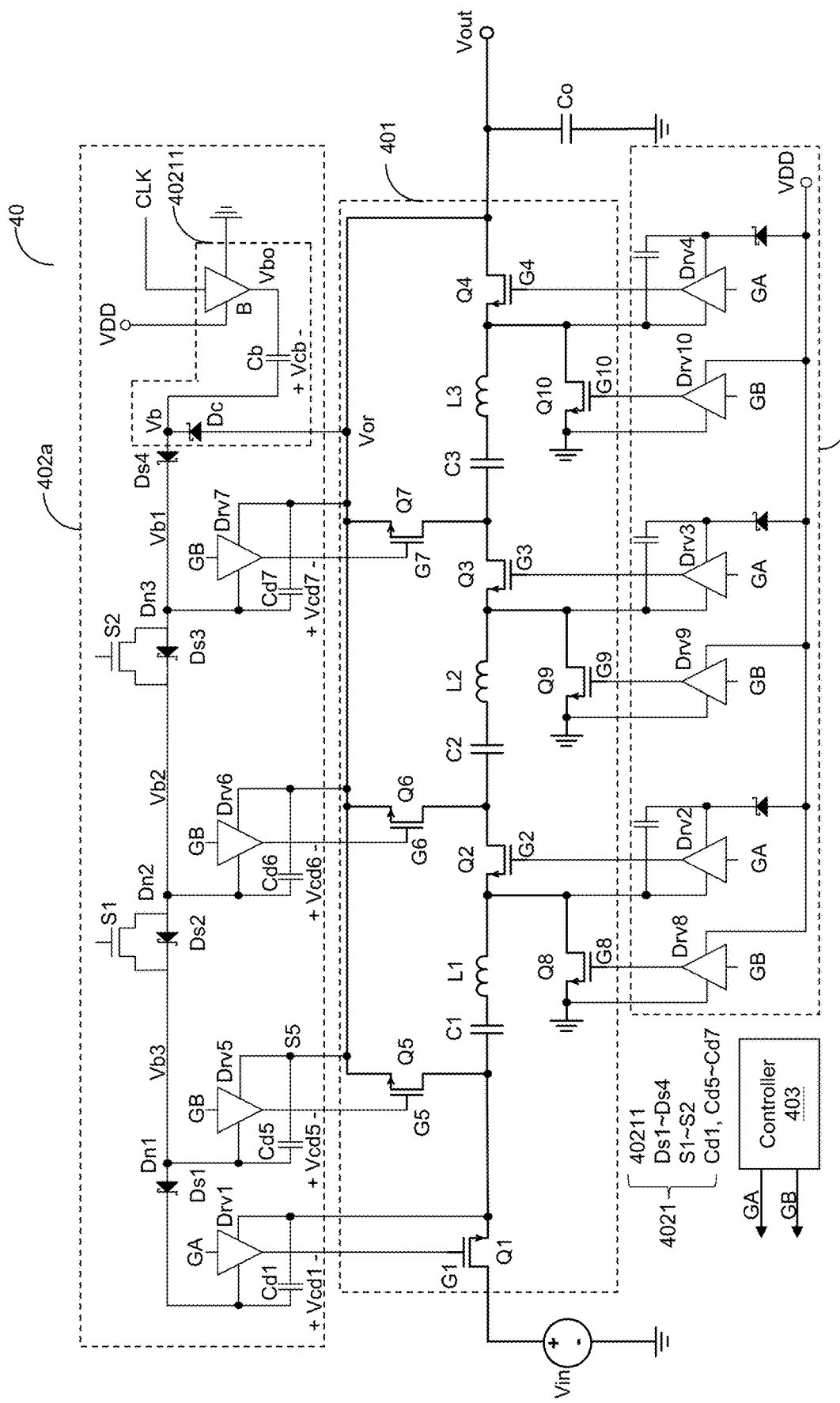
FIG. 7 shows a schematic circuit diagram of a resonant switching power converter according to yet another embodiment of the present invention.

Please refer to FIG. 7, which shows a schematic circuit diagram of a resonant switching power converter according to yet another embodiment of the present invention. The resonant switching power converter 40 of this embodiment shown in FIG. 7 is similar to the resonant switching power converter of the embodiment shown in FIG. 5, but is different in that: a power supply circuit 4021 of this embodiment includes: supply diodes Ds1~Ds4 and driving power switches S1 and S2. A power stage circuit 401, a power supply circuit 4021, a voltage booster circuit 40211, drivers Drv1~Drv10, driving capacitors Cd1 and Cd5~Cd7 and a controller 403 of this embodiment shown in FIG. 7 are similar to the power stage circuit 301, the power supply circuit 3021, the voltage booster circuit 30211, the drivers Drv1~Drv10, the driving capacitors Cd1 and Cd5~Cd7 and the controller 303 of the embodiment shown in FIG. 5, so the details thereof are not redundantly repeated here. As shown in FIG. 7, in one embodiment, the supply diodes Ds1~Ds4 are coupled in series from the booster power supply Vb in a sequential order along a forward direction of the supply diodes Ds1~Ds4. The driving capacitor Cd5 has its positive end coupled to a node Dn1 between the supply diodes Ds1 and Ds2. The driving capacitor Cd6 has its positive end coupled to a node Dn2 between the supply diodes Ds2 and Ds3. The driving capacitor Cd7 has its positive end coupled to a node Dn3 between the supply diodes Ds3 and Ds4. The negative ends of the driving capacitor Cd5~Cd7 are commonly coupled to the output related signal Vor. As shown in FIG. 7, in one embodiment, the driving power switch S1 is connected in parallel to the supply diode Ds2, whereas, the driving power switch S2 is connected in parallel to the supply diode Ds3. It should be understood that the implementation wherein the driving circuit 402a is applied to a resonant switching capacitor converter in this embodiment is only an illustrative example, but not for limiting the broadest scope of the present invention. In other embodiments, it is also practicable and within the scope of the present invention that the driving circuit 402a can be applied to a switching resonator converter shown in FIG. 2. In one embodiment, in a case where the power stage circuit corresponds to a resonant switching capacitor converter, the driving power switches S1 and S2 are arranged to be always ON. In another embodiment, in a case where the power stage circuit corresponds to a switching resonator converter, the driving power switches S1 and S2 are arranged to be always OFF. In one embodiment, each of the driving power switches S1 and S2 can be a metal-oxide-semiconductor (MOS) transistor whose body diode serves as the corresponding supply diode Ds2 or Ds3. Under such situation, additional supply diodes can be omitted.

Figure 8:
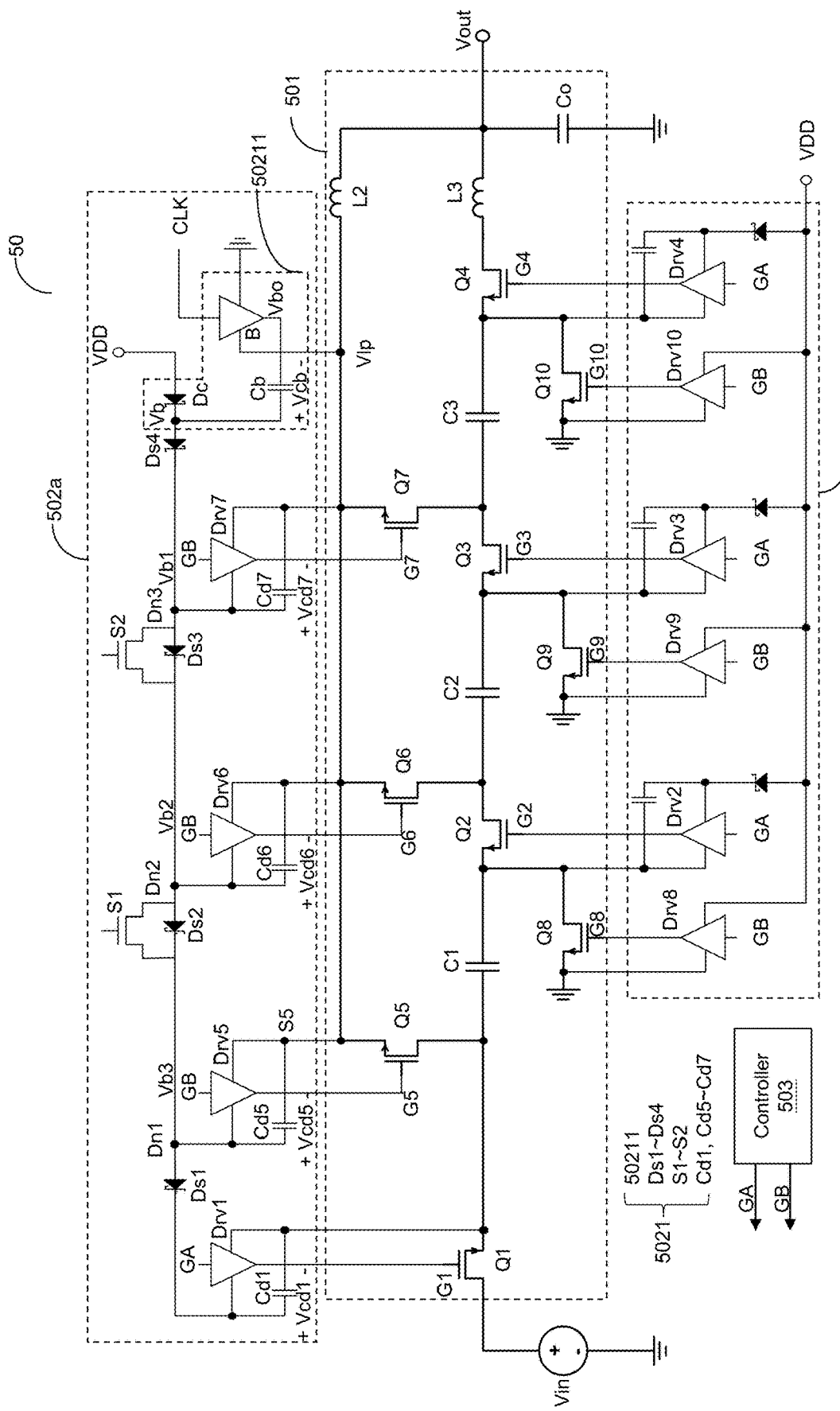
FIG. 8 shows a schematic circuit diagram of a resonant switching power converter according to still another embodiment of the present invention.

Please refer to FIG. 8, which shows a schematic circuit diagram of a resonant switching power converter according to still another embodiment of the present invention. In the power stage circuit 501 of this embodiment, a charging resonant inductor L3 is provided at a charging path and a discharging resonant inductor L2 is provided at a discharging path, so as to execute a resonant charging operation via the charging resonant inductor L3 in a resonant charging process and execute a resonant discharging operation via the discharging resonant inductor L2 in a resonant discharging process.

As shown in FIG. 8, in one embodiment, the power stage circuit 501 of the resonant switching power converter 50 comprises: resonant capacitors C1, C2 and C3, switches Q1-Q10, and a charging resonant inductor L3 and a discharging resonant inductor L2. The switches Q1, Q2 and Q3 are connected in series to the capacitors C1, C2 and C3, 1y. The switch Q4 is connected in series to the charging resonant inductor L3. However, it should be understood that the implementation of the number of the capacitors of the resonant switching power converter 50 as three in the above-mentioned preferred embodiment is only an illustrative example, but not for limiting the broadest scope of the present invention. In other embodiments, it is also practicable and within the scope of the present invention that the number of the capacitors of the resonant switching power converter 50 can be any plural number other than three. It should be understood that the number of a device in the above-mentioned preferred embodiment is only given as an illustrative example. In one embodiment, an inductance of the charging resonant inductor L3 is equal to an inductance of the discharging resonant inductor L2. In another embodiment, it can be so arranged that an inductance of the charging resonant inductor L3 has a specific ratio to an inductance of the discharging resonant inductor L2, in order for a resonant frequency of resonant charging process to be equal to a resonant frequency of resonant discharging process.

As shown in FIG. 8, in one embodiment, one end of the power switch Q5 is coupled to a node between the power switch Q1 and the capacitor C1. One end of the power switch Q6 is coupled to a node between the power switch Q2 and the capacitor C2. One end of the power switch Q7 is coupled to a node between the power switch Q3 and the capacitor C3. One end of the power switch Q8 is coupled to a node between the power switch Q2 and the resonant capacitor C1. One end of the power switch Q9 is coupled to a node between the power switch Q3 and the resonant capacitor C2. One end of the power switch Q10 is coupled to a node between the power switch Q4 and the resonant capacitor C3. As shown in FIG. 8, the other ends of the power switches Q5-Q7 are commonly electrically connected to a node which is coupled to the discharging resonant inductor L2. The other ends of the power switches Q8-Q10 are commonly coupled to the ground voltage level. The other ends of the charging resonant inductor L3 and the discharging resonant inductor L2 are commonly coupled to the output voltage Vout. The other end of the power switch Q1 is coupled to input voltage Vin. The controller 503 is configured to operably generate a charging operation signal GA corresponding to a resonant charging process and a discharging operation signal GB corresponding to a resonant discharging process.

The driving circuit 502a includes: drivers Drv1 and Drv5~Drv7 and a power supply circuit 5021. The driving circuit 502b includes drivers Drv2~Drv4 and Drv8~Drv10. The drivers Drv1~Drv10 are configured to operably generate charging driving signals G1~G4 according to the charging operation signal GA and generate discharging driving signals G5~G10 according to the discharging operation signal GB. The charging driving signals G1~G4 and the discharging driving signals G5~G10 are configured to operably and periodically operate the switches Q1~Q10 in at least one resonant charging process and at least one resonant discharging process, so as to convert the input voltage Vin to the output voltage Vout by resonant operation. In one embodiment, the charging driving signals G1~G4 are in-phase with the charging operation signal GA, whereas, the discharging driving signals G5~G10 are in-phase with the discharging operation signal GB. The power supply circuit 5021 is configured to operably provide driving powers Vcd1 and Vcd5~Vcd7 to the drivers Drv1 and Drv5~Drv7 in correspondence. The power supply circuit 5021 includes: a voltage booster circuit 50211, driving capacitors Cd1 and Cd5~Cd7, supply diodes Ds1~Ds4 and driving power switches S1 and S2. The voltage booster circuit 50211 is configured to operably generate a booster power supply Vb according to a clock signal CLK, a direct current (DC) voltage VDD and a voltage at a high-voltage end V1$p$ of a discharging resonant inductor (i.e., a voltage at a negative end of the driving power). In this embodiment, the voltage at the high-voltage end V1$p$ of the discharging resonant inductor is the above-mentioned output related signal Vor. In one embodiment, the voltage of the booster power supply Vb is related to a sum of the DC voltage VDD plus the voltage at the high-voltage end V1$p$ of the discharging resonant inductor.

In one embodiment, the voltage booster circuit 50211 includes: a booster capacitor Cb, a charging diode Dc, and a buffer B. The clock signal CLK is coupled to an input end of the buffer B. The voltage at the high-voltage end V1$p$ of the discharging resonant inductor is coupled to a positive power supply end of the buffer B, whereas, a ground voltage level is coupled to a negative power supply end of the buffer B. An output end of the buffer B is coupled to a negative end of the booster capacitor Cb. A positive end of the booster the capacitor Cb and a backward end of the charging diode Dc are commonly coupled to the booster power supply Vb. The DC voltage VDD is coupled to a forward end of the charging diode Dc. When the buffer B generates a low-level voltage at its buffer output Vbo according to the clock signal CLK and a ground voltage level, the charging diode Dc is configured to operably charge the booster capacitor Cb according to the DC voltage VDD. On the other hand, when the buffer B generates a high-level voltage at its buffer output Vbo according to the clock signal CLK and the voltage at the high-voltage end V1$p$ of the discharging resonant inductor (i.e., the voltage at the negative end of the driving power), the booster power supply Vb is generated according to a sum of a voltage Vcb across the booster capacitor Cb plus the high-level voltage.

In one embodiment, the voltage booster circuit 50211, a corresponding one of the driving capacitors Cd1 and Cd5~Cd7, a corresponding one of the supply diodes Ds1~Ds4 and a corresponding one of the switches Q1 and Q5~Q7 constitute a bootstrap circuit. For example, when the booster power supply Vb is generated by the voltage booster circuit 50211, the supply diode Ds4 charges the corresponding driving capacitor Cd7 according to the booster power supply Vb, so as to generate the corresponding driving power Vcd7. A negative end of the driving capacitor Cd7, an end of the corresponding switch Q7 and a high voltage end V1$p$ of the discharging resonant inductor are all coupled to the negative end of the driving power Vcd7. A voltage at the negative end of the driving power Vcd7 is varied as the switch Q7 performs switching and a voltage at the positive end of the driving power Vcd7 is also varied as the switch Q performs switching. When the booster power supply Vb is generated by the voltage booster circuit 50211, the supply diode Ds3 charges the corresponding driving capacitor Cd6 according to a second booster power supply (e.g., Vb1), so as to generate the corresponding driving power Vcd6. A voltage at the negative end of the driving power Vcd6 is varied as the switch Q6 performs switching and a voltage at the positive end of the driving power Vcd6 is also varied as the switch Q6 performs switching. When the booster power supply Vb is generated by the voltage booster circuit 50211, the supply diode Ds2 charges the corresponding driving capacitor Cd5 according to a second booster power supply (e.g., Vb2), so as to generate the corresponding driving power Vcd5. A voltage at the negative end of the driving power Vcd5 is varied as the switch Q5 performs switching and a voltage at the positive end of the driving power Vcd5 is also varied as the switch Q5 performs switching. When the booster power supply Vb is generated by the voltage booster circuit 50211, the supply diode Ds1 charges the corresponding driving capacitor Cd1 according to a second booster power supply (e.g., Vb3), so as to generate corresponding driving power Vcd1. A voltage at the negative end of the driving power Vcd1 is varied as the switch Q1 performs switching and a voltage at the positive end of the driving power Vcd1 is also varied as the switch Q1 performs switching. In a steady state, driving powers Vcd1 Vcd5~Vcd7 are related to the DC voltage VDD. In one embodiment, the second booster power supplies Vb1, Vb2 and Vb3 are related to the booster power supply Vb.

The supply diodes Ds1~Ds4 are coupled in series from the booster power supply Vb in a sequential order along a forward direction of the supply diodes Ds1~Ds4. The driving capacitor Cd5 has its positive end coupled to anode Dn1 between the supply diodes Ds1 and Ds2. The driving capacitor Cd6 has its positive end coupled to a node Dn2 between the supply diodes Ds2 and Ds3. The driving capacitor Cd7 has its positive end coupled to a node Dn3 between the supply diodes Ds3 and Ds4. The negative ends of the driving capacitor Cd5~Cd7 are commonly coupled to the high-voltage end V1$p$ of the discharging resonant inductor. The driving capacitor Cd1 is coupled between a backward end of the supply diode Ds1 and a source of the power switch Q1. In one embodiment, the voltage across each driving capacitor Cd1 and Cd5~Cd7 corresponds to the corresponding driving power Vcd1 and Vcd5~Vcd7, wherein each driving power Vcd1 and Vcd5~Vcd7 provides power supply to the corresponding driver Drv1 and Drv5~Drv7. In one embodiment, each driving capacitor Cd1 and Cd5~Cd7 is connected in parallel with a corresponding one of the drivers Drv1 and Drv5~Drv7 between a positive end and a negative end of the corresponding driving capacitor Cd1 and Cd5~Cd7. The output end of each driver Drv1 and Drv5~Drv7 is coupled to a gate of a corresponding one of the power switches Q1 and Q5~Q7, so as to output charging driving signal G1 and discharging driving signals G5~G7 to control the corresponding power switches Q1 and Q5~Q7. In one embodiment, the backward end of each supply diode Ds1~Ds4 is coupled to a positive end of the corresponding driving power Vcd1 and Vcd5~Vcd7, so as to charge the corresponding driving capacitor Cd1 and Cd5~Cd7, thus generating the corresponding driving power Vcd1 and Vcd5~Vcd7. Besides, the supply diodes Ds1~Ds4 are configured to operably block a backward current and a backward voltage. In this embodiment, a negative end of the driving power Vcd1 is coupled to the source S1 of the power switch Q1. The negative end of each driving power Vcd5~Vcd7 is coupled to the high-voltage end V1$p$ of the discharging resonant inductor. In one embodiment, each of the drivers Drv1 and Drv5~Drv7 is coupled between the controller 503 and a corresponding one of the power switches Q1 and Q5~Q7, wherein the drivers Drv1 and Drv5~Drv7 are configured to operably control corresponding power switches Q1 and Q5~Q7 according to the charging operation signal GA and the discharging operation signal GB. As shown in FIG. 8, in one embodiment, a driving power switch S1 is connected in parallel to the supply diode Ds2, whereas, a driving power switch S2 is connected in parallel to the supply diode Ds3.

It should be understood that the implementation where the driving circuit 502a is applied to a resonant switching capacitor converter in the above-mentioned preferred embodiment is only an illustrative example, but not for limiting the broadest scope of the present invention. In other embodiments, it is also practicable and within the scope of the present invention that the driving circuit 502a is applied to a switching resonator converter shown in FIG. 2. In one embodiment, in a case where the power stage circuit corresponds to a resonant switching capacitor converter, the driving power switches S1 and S2 are arranged to be always ON. In another embodiment, in a case where the power stage circuit corresponds to a switching resonator converter, the driving power switches S1 and S2 are arranged to be always OFF. In one embodiment, each of the driving power switches S1 and S2 can be a metal-oxide-semiconductor (MOS) transistor whose body diode serves as the supply diode Ds2 or Ds3. Under such situation, additional supply diodes can be omitted.

The switches Q1-Q10 can switch electrical connection relationships of the resonant capacitors C1-C3 with the charging resonant inductor L3 and the discharging resonant inductor L2 according to the charging driving signals G1~G4 and the discharging driving signals G5~G10. In a resonant charging process, according to the charging driving signals G1~G4 and the discharging driving signals G5~G10, the switches Q1~Q4 are ON, whereas, the switches Q5~Q10 are OFF, so that the resonant capacitors C1-C3 are connected in series and the series connection of the resonant capacitors C1-C3 is further connected in series to the charging resonant inductor L3 between the input voltage Vin and the output voltage Vout, to form a charging path. In a resonant discharging process, according to the charging driving signals G1~G4 and the discharging driving signals G5-G10, the switches Q5-Q10 are ON, whereas, the switches Q1-Q4 are OFF, so that the resonant capacitors C1-C3 is connected in parallel and the parallel connection of the resonant capacitors C1-C3 is further connected in series to the discharging resonant inductor L2, which form plural discharging paths.

Figure 9:
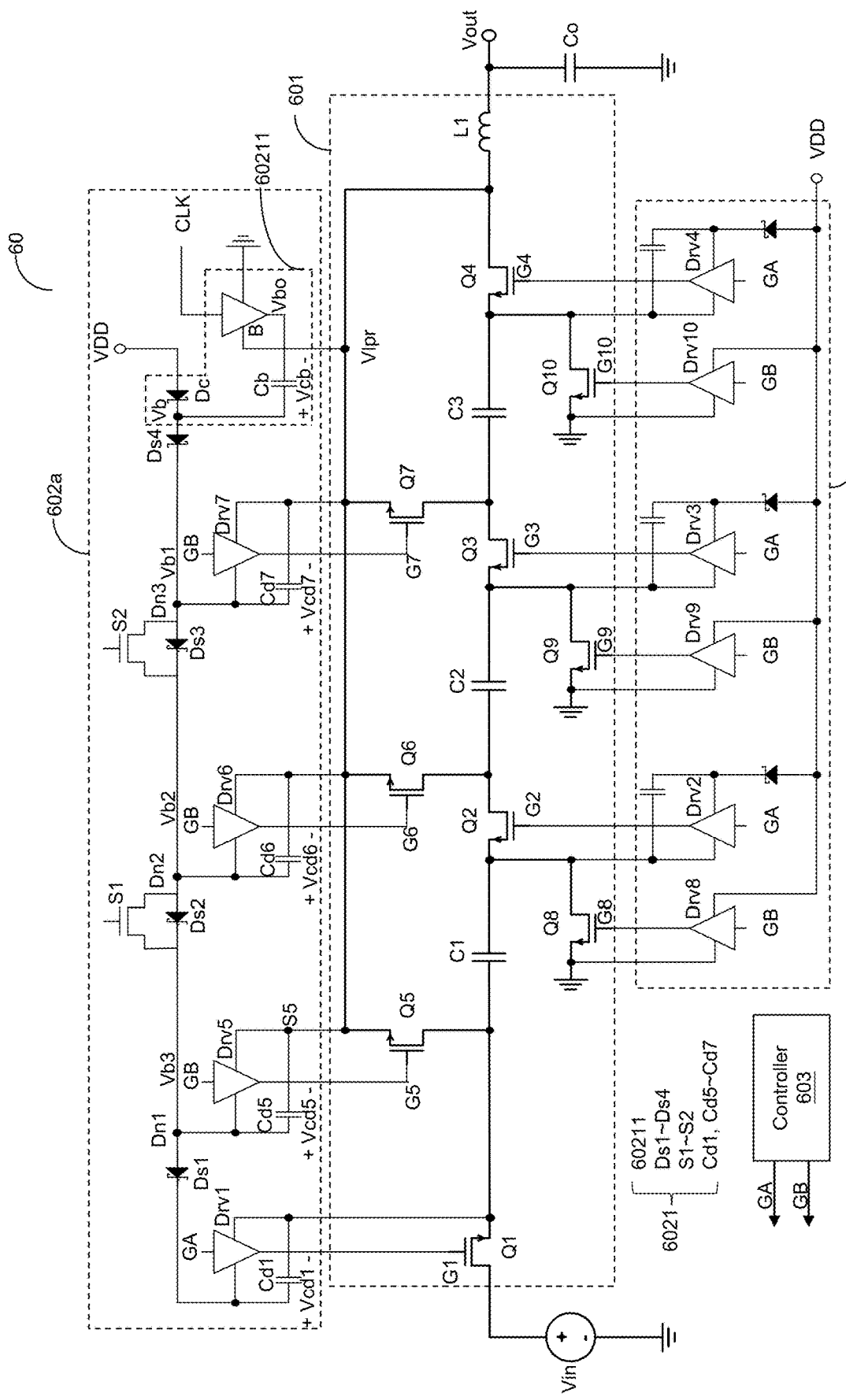
FIG. 9 shows a schematic circuit diagram of a resonant switching power converter according to still another embodiment of the present invention.

Please refer to FIG. 9, which shows a schematic circuit diagram of a resonant switching power converter according to still another embodiment of the present invention. The resonant switching power converter 60 of this embodiment shown in FIG. 9 is similar to the resonant switching power converter of the embodiment shown in FIG. 8, but is different in that: the resonant switching power converter 60 of this embodiment employs one single resonant inductor L1 to function as a charging resonant inductor in a resonant charging process and function as a discharging resonant inductor in a resonant discharging process, thus reducing the required inductor number. A driving circuit 602a and a controller 603 of this embodiment shown in FIG. 9 is similar to the driving circuit 502a and the controller 503 of the embodiment shown in FIG. 8, so the details thereof are not redundantly repeated here. In this embodiment, a signal V1pr related to the voltage at the high-voltage end V1p of the resonant inductor is coupled to a positive end of the resonant inductor L1 and this signal V1pr is related to a voltage at the positive end of the resonant inductor L1. In this embodiment, a buffer B of a voltage booster circuit 60211 has its positive power supply end coupled to the signal V1pr which is related to the voltage at the high-voltage end V1p of the resonant inductor. Besides, the negative ends of the driving capacitors Cd5~Cd7 are commonly coupled to the signal V1pr which is related to the voltage at the high-voltage end V1p of the resonant inductor.

As shown in FIG. 9, in one embodiment, the resonant switching power converter 60 comprises a power stage circuit 601. The power stage circuit 601 comprises: resonant capacitors C1, C2 and C3, switches Q1-Q10, and a resonant inductor L1. The switches Q1, Q2 and Q3 are connected in series to the capacitors C1, C2 and C3, respectively. The capacitor Q4 is connected in series to the resonant inductor L1. In one embodiment, the resonant inductor L1 is a variable resonant inductor.

As shown in FIG. 9, in one embodiment, one end of the power switch Q5 is coupled to a node between the power switch Q1 and the capacitor C1. One end of the power switch Q6 is coupled to a node between the power switch Q2 and the capacitor C2. One end of the power switch Q7 is coupled to a node between the power switch Q3 and the capacitor C3. One end of the power switch Q8 is coupled to a node between the power switch Q2 and the resonant capacitor C1. One end of the power switch Q9 is coupled to a node between the power switch Q3 and the resonant capacitor C2. One end of the power switch Q10 is coupled to a node between the power switch Q4 and the resonant capacitor C3. As shown in FIG. 9, the other ends of the power switches Q5-Q7 are commonly electrically connected to a node which is coupled to a node between the power switch Q4 and the resonant inductor L1 (i.e., a signal V1pr related to the voltage at the high-voltage end V1p of the discharging resonant inductor). The other ends of the power switches Q8-Q10 are commonly coupled to the ground voltage level. The other end of the resonant inductor L1 is coupled to the output voltage Vout. The other end of the power switch Q1 is coupled to input voltage Vin.

Please still refer to FIG. 9. The switches Q1-Q10 can switch electrical connection relationships between the resonant capacitors C1-C3 and the resonant inductor L1 according to the charging driving signals G1~G4 and the discharging driving signals G5~G10. In a resonant charging process, according to the charging driving signals G1~G4 and the discharging driving signals G5~G10, the switches Q1-Q4 are ON, whereas, the switches Q5-Q10 are OFF, so that the resonant capacitors C1-C3 are connected in series and the series connection of the resonant capacitors C1-C3 is further connected in series to the resonant inductor L1 between the input voltage Vin and the output voltage Vout, to form a charging path. In a resonant discharging process, according to the charging driving signals G1~G4 and the discharging driving signals G5~G10, the switches Q5-Q10 are ON, whereas, the switches Q1-Q4 are OFF, so that the resonant capacitors C1-C3 are connected in parallel and the parallel connection of the resonant capacitors C1-C3 is further connected in series to the resonant inductor L1, which form plural discharging paths.

It is noteworthy that, in one embodiment, the above-mentioned resonant charging process and the above-mentioned resonant discharging process are arranged at different periods in a repeated, alternating manner, to perform resonant charging operation on the above-mentioned resonant capacitor and resonant inductor by energy supplied from the input voltage Vin and to perform resonant discharging operation on the above-mentioned resonant capacitor and resonant inductor, so as to convert energy stored in the resonant capacitor and resonant inductor to the output voltage Vout. The above-mentioned resonant charging process and the above-mentioned resonant discharging process are not performed at the same time. In this embodiment, the DC bias voltages of the capacitors C1, C2 and C3 all have a level of Vo. Hence, the capacitors C1, C2 and C3 of the present invention will only need to withstand a relatively lower rated voltage. Hence, the present invention can use capacitors having a smaller size. In one embodiment, a voltage conversion ratio of the input voltage Vin to the output voltage Vout of the above-mentioned resonant switching power converter 20 is 4:1, 3:1 or 2:1

In one embodiment, the voltage conversion ratio of the above-mentioned resonant switching power converter 60 is adjustable. For example, in the resonant charging process and in the resonant discharging process, by keeping the switch Q7 to be always ON while keeping the switches Q4 and Q10 to be always OFF, the voltage conversion ratio of the power stage circuit 601 can be adjusted to be 3:1. For another example, in the resonant charging process and in the resonant discharging process, by keeping the switch Q6 to be always ON while keeping the switches Q9, Q3, Q7, Q4 and Q10 to be always OFF, the voltage conversion ratio of the power stage circuit 601 can be adjusted to be 2:1.

The present invention provides a resonant switching power converter as described above. Advantages of the present invention include: that the driving circuit of the present invention can support different switching power converters having different topologies; that the present invention can provide sufficient power to a power stage circuit via one single power supply circuit; that the driving circuit of the present invention can achieve optimal power efficiency by adjusting the supply voltage; and that as compared to prior art driving circuit, the driving circuit of the present invention requires less numbers of devices and pins.

The present invention has been described in considerable detail with reference to certain preferred embodiments thereof. It should be understood that the description is for illustrative purpose, not for limiting the broadest scope of the present invention. An embodiment or a claim of the present invention does not need to achieve all the objectives or advantages of the present invention. The title and abstract are provided for assisting searches but not for limiting the scope of the present invention. Those skilled in this art can readily conceive variations and modifications within the spirit of the present invention. For example, to perform an action "according to" a certain signal as described in the context of the present invention is not limited to performing an action strictly according to the signal itself, but can be performing an action according to a converted form or a scaled-up or down form of the signal, i.e., the signal can be processed by a voltage-to-current conversion, a current-to-voltage conversion, and/or a ratio conversion, etc. before an action is performed. It is not limited for each of the embodiments described hereinbefore to be used alone; under the spirit of the present invention, two or more of the embodiments described hereinbefore can be used in combination. For example, two or more of the embodiments can be used together, or, a part of one embodiment can be used to replace a corresponding part of another embodiment. In view of the foregoing, the spirit of the present invention should cover all such and other modifications and variations, which should be interpreted to fall within the scope of the following claims and their equivalents.

What is claimed is:

1. A resonant switching power converter, which is configured to operably convert an input voltage to an output voltage; the resonant switching power converter comprising:
   a power stage circuit, including:
   at least one resonant capacitor;
   at least one resonant inductor, which is coupled to the at least one resonant capacitor; and
   a plurality of switches, which are configured to operably switch electrical connection relationships among the at least one resonant capacitor, the at least one resonant inductor, the input voltage and the output voltage;
   wherein the power stage circuit includes a first power stage circuit or a second power stage circuit, wherein sources of a part of the plurality of switches of the first power stage circuit are electrically connected with one another at a node, wherein sources of the plurality of switches of the second power stage circuit are not coupled with one another;
   a driving circuit, including:
   a plurality of drivers, which are configured to operably generate a plurality of driving signals according to a plurality of operation signals, wherein the plurality of driving signals are configured to operably and periodically operate at least a part of the plurality of switches in at least one resonant charging process and at least one resonant discharging process, so as to convert the input voltage to the output voltage by resonant operation, wherein in a case where the power stage circuit is the first power stage circuit, a plurality of driving powers needed by the plurality of drivers are connected in parallel with one another, wherein in a case where the power stage circuit is the second power stage circuit, two driving powers of the plurality of driving powers needed by two drivers of the plurality of drivers to which two adjacent switches of the plurality of switches correspond are unidirectionally electrically connected with each other; and
   a single power supply circuit, which is configured to operably provide the plurality of driving powers to a part of the plurality of drivers, wherein the plurality of driving powers include a plurality of driving voltages, wherein the power supply circuit includes:
   a voltage booster circuit, which is configured to operably generate a booster power supply according to a clock signal, a direct current (DC) voltage and an output related signal which is related to the output voltage, wherein a voltage of the booster power supply is related to a sum of the DC voltage plus the output related signal;
   a plurality of driving capacitors, wherein a voltage across each driving capacitor corresponds to a corresponding one of the driving powers;
   a plurality of supply diodes, which are coupled in series from the booster power supply along a forward direction of the plurality of supply diodes, wherein a backward end of each supply diode is coupled to a positive end of the corresponding driving power, so as to charge a corresponding one of the driving capacitors, thus generating the corresponding driving power, and wherein the plurality of supply diodes are configured to operably block a backward current and a backward voltage; and
   a plurality of driving power switches, wherein each driving power switch is connected in parallel to a corresponding one of a part of the plurality of supply diodes;

wherein in a first mode, the plurality of driving power switches are controlled to be always ON, such that the plurality of driving powers are connected in parallel with one another, so as to provide power for the plurality of drivers to which the first power stage circuit corresponds;

wherein in a second mode, the plurality of driving power switches are controlled to be always OFF, such that two adjacent driving powers of the plurality of driving powers are unidirectionally electrically connected with each other, so as to provide power for the plurality of drivers to which the second power stage circuit corresponds;

wherein voltage ranges of the driving voltages for the plurality of drivers are partially overlapped or unoverlapped.

2. The resonant switching power converter of claim 1, wherein the voltage booster circuit, a corresponding one of the driving capacitors and a corresponding one of the supply diodes constitute a charge pump, and wherein when the booster power supply is generated by the voltage booster circuit, the corresponding supply diode charges the corresponding driving capacitor according to the booster power supply, so as to generate the corresponding driving power, wherein a negative end of the corresponding driving power is coupled to the output voltage, and wherein the corresponding driving power is related to the DC voltage.

3. The resonant switching power converter of claim 2, wherein an operation frequency of the charge pump is greater than or equal to a switching frequency of the plurality of switches.

4. The resonant switching power converter of claim 1, wherein the voltage booster circuit includes: a booster capacitor, a charging diode, and a buffer, wherein when a high-level voltage is generated by the buffer according to the clock signal and the DC voltage, the booster power supply is generated according to a sum of a voltage across the booster capacitor plus the high-level voltage, and wherein when a low-level voltage is generated by the buffer according to the clock signal and a ground voltage level, the charging diode is configured to operably charge the booster capacitor according to the output related signal, wherein the output related signal corresponds to the output voltage.

5. The resonant switching power converter of claim 1, wherein the voltage booster circuit, a corresponding one of the driving capacitors, a corresponding one of the supply diodes and a corresponding one of the switches constitute a bootstrap circuit, and wherein when the booster power supply is generated by the voltage booster circuit, the corresponding supply diode charges the corresponding driving capacitor according to a second booster power supply, so as to generate the corresponding driving power, wherein a voltage at the negative end of the corresponding driving power is varied as the plurality of switches perform switching and a voltage at a positive end of the corresponding driving power is also varied as the plurality of switches perform switching, wherein in a steady state, the corresponding driving power is related to the DC voltage, wherein the second booster power supply is related to the booster power supply.

6. The resonant switching power converter of claim 5, wherein the voltage booster circuit includes: a booster capacitor, a charging diode, and a buffer, wherein when a high-level voltage is generated by the buffer according to the clock signal and the voltage at the negative end of the corresponding driving power, the booster power supply is generated according to a sum of a voltage across the booster capacitor plus the high-level voltage, and wherein when a low-level voltage is generated by the buffer according to the clock signal and a ground voltage level, the charging diode is configured to operably charge the booster capacitor according to the DC voltage.

7. The resonant switching power converter of claim 5, wherein the at least one resonant inductor includes: at least one charging resonant inductor and at least one discharging resonant inductor, wherein the at least one discharging resonant inductor is coupled between the output voltage and the negative end of the corresponding driving power, and wherein a negative end of the corresponding driving capacitor, an end of the corresponding switch and a high voltage end of the at least one discharging resonant inductor are all coupled to the negative end of the corresponding driving power;

wherein in the at least one resonant charging process, the at least one charging resonant inductor is connected in series to the at least one resonant capacitor, so as to execute a resonant charging operation, and wherein in the at least one resonant discharging process, the at least one discharging resonant inductor is connected in series to the at least one resonant capacitor, so as to execute a resonant discharging operation.

8. The resonant switching power converter of claim 1, wherein when the voltage ranges of the driving voltages for the plurality of drivers are identical, the power stage circuit is a resonant switching capacitor converter;

wherein in the at least one resonant charging process, the power stage circuit is configured to operably control the plurality of switches, so that a series connection of the at least one resonant capacitor and the at least one resonant inductor is formed between the input voltage and the output voltage, to form a charging path, whereby a resonant charging operation is performed on the at least one resonant capacitor and the at least one resonant inductor;

wherein in the at least one resonant discharging process, the power stage circuit is configured to operably control the plurality of switches, so that a series connection of each resonant capacitor and a corresponding one of the resonant inductors is formed between the output voltage and a ground voltage level, to simultaneously or sequentially form a plurality of discharging paths, whereby a resonant discharging operation is performed on the at least one resonant capacitor and the at least one resonant inductor, thus generating the output voltage.

9. The resonant switching power converter of claim 8, wherein the resonant switching power converter is a bidirectional resonant switching power converter.

10. The resonant switching power converter of claim 8, wherein in a case where a conversion ratio of the input voltage of the resonant switching power converter to the output voltage of the resonant switching power converter is N:1, a number of the at least one resonant capacitor is equal to N−1, wherein N denotes a positive integer.

11. The resonant switching power converter of claim 1, wherein when the voltage ranges of the driving voltages for the plurality of drivers are different, the power stage circuit is a switching resonator converter, and wherein the power stage circuit further includes: at least one resonator and at least one nonresonant capacitor, wherein the at least one resonator is formed by the at least one resonant capacitor and the at least one resonant inductor which are connected in series to each other; wherein the plurality of switches are coupled to the at least one resonator and the at least one nonresonant capacitor and are configured to operably switch electrical connection relationships of the at least one resonator and the at least one nonresonant capacitor;

wherein in the at least one resonant charging process, a resonant charging operation is performed on the at least one resonator;

wherein in the at least one resonant discharging process, a resonant discharging operation is performed on the at least one resonator to charge the at least one nonresonant capacitor, thus generating the output voltage.

12. The resonant switching power converter of claim 1, wherein the first power stage circuit is a resonant switching capacitor converter, and/or the second power stage circuit is a switching resonator converter.

13. The resonant switching power converter of claim 12, wherein each of the driving power switches is a metal-oxide-semiconductor (MOS) transistor whose body diode corresponds to one of the supply diodes.

14. A driving circuit, which is configured to operably drive a resonant switching power converter, wherein the resonant switching power converter is configured to operably convert an input voltage to an output voltage and the resonant switching power converter comprises a power stage circuit, wherein the power stage circuit includes a plurality of switches; wherein the power stage circuit includes a first power stage circuit or a second power stage circuit, wherein sources of a part of the plurality of switches of the first power stage circuit are electrically connected with one another at a node, wherein sources of the plurality of switches of the second power stage circuit are not coupled with one another, the driving circuit comprising:

a plurality of drivers, which are configured to operably generate a plurality of driving signals according to a plurality of operation signals, wherein the plurality of driving signals are configured to operably and periodically operate at least a part of the plurality of switches in at least one resonant charging process and at least one resonant discharging process, so as to convert the input voltage to the output voltage by resonant operation, wherein in a case where the power stage circuit is the first power stage circuit, a plurality of driving powers needed by the plurality of drivers are connected in parallel with one another, wherein in a case where the power stage circuit is the second power stage circuit, two driving powers of the plurality of driving powers needed by two drivers of the plurality of drivers to which two adjacent switches of the plurality of switches correspond are unidirectionally electrically connected with each other; and a single power supply circuit, which is configured to operably provide the plurality of driving powers to a part of the plurality of drivers, wherein the plurality of driving powers include a plurality of driving voltages, wherein the power supply circuit includes:

a voltage booster circuit, which is configured to operably generate a booster power supply according to a clock signal, a direct current (DC) voltage and an output related signal which is related to the output voltage, wherein a voltage of the booster power supply is related to a sum of the DC voltage plus the output related signal;

a plurality of driving capacitors, wherein a voltage across each driving capacitor corresponds to a corresponding one of the driving powers;

a plurality of supply diodes, which are coupled in series from the booster power supply along a forward direction of the plurality of supply diodes, wherein a backward end of each supply diode is coupled to a positive end of the corresponding driving power, so as to charge a corresponding one of the driving capacitors, thus generating the corresponding driving power, and wherein the plurality of supply diodes are configured to operably block a backward current and a backward voltage; and a plurality of driving power switches, wherein each driving power switch is connected in parallel to a corresponding one of a part of the plurality of supply diodes;

wherein in a first mode, the plurality of driving power switches are controlled to be always ON, such that the plurality of driving powers are connected in parallel with one another, so as to provide power for the plurality of drivers to which the first power stage circuit corresponds;

wherein in a second mode, the plurality of driving power switches are controlled to be always OFF, such that two adjacent driving powers of the plurality of driving powers are unidirectionally electrically connected with each other, so as to provide power for the plurality of drivers to which the second power stage circuit corresponds;

wherein voltage ranges of the driving voltages for each of the plurality of drivers are partially overlapped or unoverlapped.

15. The driving circuit of claim 14, wherein the voltage booster circuit, a corresponding one of the driving capacitors and a corresponding one of the supply diodes constitute a charge pump, and wherein when the booster power supply is generated by the voltage booster circuit, the corresponding supply diode charges the corresponding driving capacitor according to the booster power supply, so as to generate the corresponding driving power, wherein a negative end of the corresponding driving power is coupled to the output voltage, and wherein the corresponding driving power is related to the DC voltage.

16. The driving circuit of claim 15, wherein the voltage booster circuit includes: a booster capacitor, a charging diode, and a buffer, wherein when a high-level voltage is generated by the buffer according to the clock signal and the DC voltage, the booster power supply is generated according to a sum of a voltage across the booster capacitor plus the high-level voltage, and wherein when a low-level voltage is generated by the buffer according to the clock signal and a ground voltage level, the charging diode is configured to operably charge the booster capacitor according to the output related signal, wherein the output related signal corresponds to the output voltage.

17. The driving circuit of claim 15, wherein an operation frequency of the charge pump is greater than or equal to a switching frequency of the plurality of switches.

18. The driving circuit of claim 14, wherein the voltage booster circuit, a corresponding one of the driving capacitors, a corresponding one of the supply diodes and a corresponding one of the switches constitute a bootstrap circuit, and wherein when the booster power supply is generated by the voltage booster circuit, the corresponding supply diode charges the corresponding driving capacitor according to a second booster power supply, so as to generate the corresponding driving power, wherein a voltage at the negative end of the corresponding driving power is varied as the plurality of switches perform switching and a voltage at a positive end of the corresponding driving power is also varied as the plurality of switches perform switching, wherein in a steady state, the corresponding driving power is related to the DC voltage, wherein the second booster power supply is related to the booster power supply.

19. The driving circuit of claim 18, wherein the voltage booster circuit includes: a booster capacitor, a charging diode, and a buffer, wherein when a high-level voltage is generated by the buffer according to the clock signal and the voltage at the negative end of the corresponding driving power, the booster power supply is generated according to a sum of a voltage across the booster capacitor plus the high-level voltage, and wherein when a low-level voltage is generated by the buffer according to the clock signal and a ground voltage level, the charging diode is configured to operably charge the booster capacitor according to the DC voltage.

20. The driving circuit of claim 14, wherein the first power stage circuit is a resonant switching capacitor converter, and/or the second power stage circuit is a switching resonator converter.

21. The driving circuit of claim 20, wherein each of the driving power switches is a metal-oxide-semiconductor (MOS) transistor whose body diode corresponds to one of the supply diodes.

\* \* \* \* \*